United States Patent
Finkelstein et al.

(10) Patent No.: US 9,081,894 B2
(45) Date of Patent: Jul. 14, 2015

(54) NON-INSTRUSIVE NETWORK SURVEILLANCE AND CHARACTERIZATION

(75) Inventors: Eva Finkelstein, Cote St. Luc (CA); Djordje Konforti, Montreal West (CA); Rafi Rabipour, Cote St. Luc (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 678 days.

(21) Appl. No.: 13/483,367

(22) Filed: May 30, 2012

(65) Prior Publication Data
US 2013/0322503 A1 Dec. 5, 2013

(51) Int. Cl.
G06F 11/00 (2006.01)
G06F 11/36 (2006.01)
G06F 11/30 (2006.01)

(52) U.S. Cl.
CPC ........ *G06F 11/3612* (2013.01); *G06F 11/3027* (2013.01); *G06F 11/3096* (2013.01); *G06F 11/364* (2013.01); *G06F 11/3644* (2013.01)

(58) Field of Classification Search
CPC .................................................. G06F 11/3027
See application file for complete search history.

(56) References Cited

U.S. PATENT DOCUMENTS

2010/0275185 A1   10/2010   Burton et al.

*Primary Examiner* — Christopher McCarthy
(74) *Attorney, Agent, or Firm* — Baker Botts, LLP

(57) ABSTRACT

In a system (20) handles plural communication channels (26), pre-configured instrumentation code (50) is loaded into a common program memory. The instrumentation code (50) is used to generate a surveillance element (70). The surveillance element (70) comprises multi-dimensional execution criteria and executable surveillance code configured to cause performance by a target processor unit of a surveillance element-specified surveillance action. The surveillance element (70) is executed by the target processor unit with respect to the respective subset of plural communication channels and permits continued transport of data over the plural communication channels.

47 Claims, 15 Drawing Sheets

NON-INSTRUSIVE NETWORK SURVEILLANCE AND CHARACTERIZATION

TECHNICAL FIELD

The technology relates to monitoring of communication channels and equipment which handle or operate upon such communication channels.

BACKGROUND

In any stored-program-controlled system deploying single or multi core general purpose processors or DSP devices, the debugging and troubleshooting process requires direct real-time access to specific processor devices and their plural processor units. It is necessary to have the flexibility to examine their registers, memory, and data structures at various stages of processing, without affecting the operation of active plural processor units. At present the conventional means of capturing data required for troubleshooting and/or system/network analysis is either through prior code instrumentation or by using commercially available debuggers.

For code instrumentation it is not feasible to instrument an initial version of the code for access to all possible data structures. Accordingly, once new or different data structures are determined to be necessary for a given troubleshooting activity, the related code instrumentation requires the release of new software versions. Implementation of new software versions occasion significant cost and delay, both in terms of development and actual deployment. Moreover, in general customers regard debug load deployment as a major inconvenience.

On the other hand, commercial debug packages require physical connectivity to the target under test. Moreover, by the nature of their intrusive operation, debug packages can cause users to lose their sessions, calls to be dropped, or otherwise affect the operation of the system. Troubleshooting of live systems requires that user sessions or calls are not impaired in any way. Yet external equipment connectivity to the target under test is, in most cases, not feasible in a live system environment and is highly discouraged or even not allowed by customers.

SUMMARY

In one of its aspects the technology disclosed herein concerns a method of operating a system which handles plural communication channels. In a basic embodiment and mode the method comprises, before onset of communications over the plural communication channels, loading pre-configured instrumentation code into a common program memory stored in a memory device. The instrumentation code along with system operation code in the memory device is accessible and executable by plural processor units of the system. The system operation code is configured to cause each of the plural processor units to perform one or more operations, with each of the processor units being configured to perform the one or more operations with respect to a respective subset of plural communication channels. The basic mode of the method further comprises using the instrumentation code to generate a surveillance element. The surveillance element comprises multi-dimensional execution criteria and executable surveillance code configured to cause performance by a target processor unit of a surveillance element-specified surveillance action. The basic mode of the method further comprises executing the surveillance element by the target processor unit. Such execution of the surveillance element may, in an example non-exclusive implementation, occur in the context of performance by the target processor unit of the one or more operations with respect to the respective subset of plural communication channels and permit continued transport of data over the plural communication channels.

In an example embodiment and mode the method further comprises executing the surveillance element without disrupting performance of the one or more operations of the target processor unit with respect to the respective subset of plural communication channels and while other ones of the plural processor units perform the one or more operations with respect to their respective subsets of plural communication channels, and without modifying the instrumentation code during the execution of the surveillance element.

In an example embodiment and mode the method further comprises a user specifying the multi-dimensional execution criteria by supplying multi-dimensional execution criteria inputs to the instrumentation code either before or after the onset of the communications over the plural communications channels. In an example embodiment and mode the multi-dimensional execution criteria comprises at least one of: an indication of a target digital signal processor circuit upon which resides the target processor unit which executes the surveillance element; an indication of the target processor unit to execute the surveillance element; an indication of a target channel for surveillance; an indication of a trigger criteria which, when satisfied, prompts execution of the surveillance element; and an indication of the surveillance element-specified surveillance action. In an example implementation, the multi-dimensional execution criteria further comprises an indication of direction of a target channel for surveillance.

In an example embodiment and mode the system comprises a digital signal processor device which comprises the plural processor units.

In an example embodiment and mode the system comprises plural digital signal processor devices.

In an example embodiment and mode the system comprises one of a radio base station node, a radio network controller (RNC) node, and a media gateway.

In an example embodiment and mode plural communication channels carry at least one of speech, data, or video signals or bearers.

In an example embodiment and mode at least one of the operations performed with respect to the respective subset of the plural communication channels comprises echo cancellation, transcoding between different types of compression techniques at opposite ends of the connection; transcoding for video resolution; and protocol conversion with respect to different data protocols at the opposite ends of the connection.

In an example embodiment and mode the method further comprises generating the surveillance element to comprise a surveillance configuration table and the executable surveillance code configured to cause performance by the target processor unit of the surveillance element-specified surveillance action. The surveillance configuration table is configured to store the multi-dimensional execution criteria. The executable surveillance code comprises instructions which are generic to plural surveillance elements created by the instrumentation code but supplied with information from the surveillance configuration table for handling the surveillance element-specified surveillance action.

In an example embodiment and mode the method further comprises: executing a host application code on a host processor; receiving a user command when executing the host application code, the user command including information specifying an issue to be diagnosed; and, the host application code translating the information specifying the issue to be diagnosed into the multi-dimensional execution criteria.

In an example embodiment and mode the method further comprises the target processor unit performing at least one of the following as the surveillance element-specified surveillance action: (1) monitoring data carried on a surveillance element-specified one of the communication channels comprising the respective subset; (2) changing (injecting or manipulating) data carried on the surveillance element-specified one of the communication channels comprising the respective subset; (3) redirecting execution by the target processor unit of the system operation code; (4) patching code by adding either a generic pre-defined or user-defined routine which is patched into the system code; (5) streaming out from the surveillance element-specified one of the communication channels comprising the respective subset to a surveillance channel; (6) performing a pre-defined debug action as the surveillance element-specified surveillance action; (7) performing a user-defined debug action as the surveillance element-specified surveillance action; and (8) initiating generation of another surveillance element as the surveillance element-specified surveillance action. The target processor unit initiating the generation of the another surveillance element also specifies the multi-dimensional execution criteria for the another surveillance element.

In an example embodiment and mode the multi-dimensional criteria comprises an indication of a trigger criteria which, when satisfied, prompts execution of the surveillance element. Upon occurrence or detection of an event which satisfies the trigger criteria an interrupt is generated which is accessible to the plural processor units but evokes a surveillance-element specified surveillance action only for selected ones of the plural processor units.

In an example embodiment and mode the multi-dimensional execution criteria comprises an indication of a trigger criteria. When an event occurs or is detected which meets the trigger criteria, an interrupt is generated to prompt execution of the surveillance element. In an example embodiment the system comprises a hardware circuit which generates an interrupt signal upon occurrence of a pre-defined circuit event (e.g., the event that satisfies the trigger criteria)

In an example embodiment and mode the method further comprises using the instrumentation code to generate and execute plural surveillance elements and further, as a result of executing of the plural surveillance elements, generating performance characterization data for a system comprising the target system.

In another of its aspects the technology disclosed herein concerns a system comprising a common memory and plural processor units. The common memory comprises pre-loaded instrumentation code, system operation code and data. The plural processor units have access to the common memory and to the instrumentation code and the system operation code stored therein. Execution of the system operation code causes each of the plural processor units to perform one or more operations, each of the processor units being configured to perform the one or more operations with respect to a respective subset of plural communication channels. In a basic embodiment execution of the pre-loaded instrumentation code, after the onset of the communications over the plural communication channels and during execution of the system operation code by the plural processor units, generates a surveillance element. The surveillance element comprises multi-dimensional execution criteria and executable surveillance code configured to cause performance by a target processor unit of a surveillance element-specified surveillance action. In an example implementation such execution of the surveillance element may occur in the context of performance by the target processor unit of the one or more operations with respect to the respective subset of plural communication channels. In such implementation execution of the surveillance element permits continued transport of data over the plural communication channels.

In an example embodiment the surveillance element is configured to be executed without disrupting performance of the one or more operations of the target processor unit with respect to the respective subset of plural communication channels and while other ones of the plural processor units perform the one or more operations with respect to their respective subsets of plural communication channels, and without modifying the instrumentation code during the execution of the surveillance element.

In an example embodiment the system further comprises a host processor configured to specify the multi-dimensional execution criteria to the pre-loaded instrumentation code by supplying multi-dimensional execution criteria inputs either before or after the onset of the communications over the plural communications channels.

In an example embodiment the multi-dimensional execution criteria comprises: an indication of a target digital signal processor circuit upon which resides the target processor unit which executes the surveillance element; an indication of the target processor unit to execute the surveillance element; an indication of a target channel for surveillance; an indication of a trigger event to prompt execution of the surveillance element; an indication of the surveillance element-specified surveillance action; and an indication of direction of target channel surveillance.

In an example embodiment the system comprises a digital signal processor device which comprises the plural processor units.

In an example embodiment the system comprises plural digital signal processor devices.

In an example embodiment the system comprises one of a radio base station node, a radio network controller (RNC) node, and a media gateway.

In an example embodiment the plural communication channels carry speech, data, or video signals or bearers In an example embodiment at least one of the operations performed with respect to the respective subset of the plural communication channels comprises echo cancellation, transcoding between different types of compression techniques at opposite ends of the connection; transcoding for video resolution; and protocol conversion with respect to different data protocols at the opposite ends of the connection In an example embodiment the pre-loaded instrumentation code is configured to generate the surveillance element to comprise a surveillance configuration table and the executable surveillance code configured to cause performance by the target processor unit of the surveillance element-specified surveillance action. The surveillance configuration table is configured to store the multi-dimensional execution criteria. The executable surveillance code comprises instructions which are generic to plural surveillance elements created by the instrumentation code but supplied with information from the surveillance configuration table for facilitating the surveillance element-specified surveillance action (using the surveillance configuration table for supplying input(s)/argument(s) to template executable instructions).

In an example embodiment the system further comprises a host processor configured to execute a host application code. The host processor receives a user command including information specifying an issue to be diagnosed. The host processor translates the information specifying the issue to be diagnosed into the multi-dimensional execution criteria.

In an example embodiment the surveillance element is configured to cause the target processor unit to perform at least one of the following as the surveillance element-specified surveillance action: (1) monitoring data carried on a surveillance element-specified one of the communication channels comprising the respective subset; (2) changing (injecting or manipulating) data carried on the surveillance element-specified one of the communication channels comprising the respective subset; (3) redirecting execution by the target processor unit of the system operation code; (4) patching code by adding either a generic pre-defined or user-defined routine which is patched into the system code; (5) streaming out from the surveillance element-specified one of the communication channels comprising the respective subset to a surveillance channel; (6) performing a pre-defined debug action as the surveillance element-specified surveillance action; (7) performing a user-defined debug action as the surveillance element-specified surveillance action; and (8) initiating generation of another surveillance element as the surveillance element-specified surveillance action. The target processor unit initiating the generation of the another surveillance element also specifies the multi-dimensional execution criteria for the another surveillance element.

In an example embodiment the multi-dimensional criteria comprises an indication of a trigger criteria. When an event occurs which meets the trigger criteria, an interrupt is generated to prompt execution of the surveillance element. An interrupt generated by an event which satisfies the trigger criteria is accessible by the plural processor units but evokes a surveillance-element specified surveillance action only for selected ones of the plural processor units.

In an example embodiment the multi-dimensional execution criteria comprises an indication of a trigger criteria. When an event occurs which meets the trigger criteria, an interrupt is generated to prompt execution of the surveillance element. The system comprises a hardware circuit which generates an interrupt signal upon occurrence of a pre-defined circuit event (e.g., the event that satisfies the trigger criteria).

In an example embodiment the instrumentation code is configured to generate and execute plural surveillance elements, and the system further comprises a host processor which, as a result of executing of the plural surveillance elements, generates data that facilitates performance characterization for a system comprising the target system.

In another of its example aspects the technology disclosed herein concerns a computer program product comprising coded instructions stored on non-transient computer-readable media. When executing the instructions of the computer program product, a processor performs the act of loading pre-configured instrumentation code into a common program memory of a communication device. The pre-configured instrumentation code is configured so that, when executed, it generates a surveillance element. The surveillance element comprises multi-dimensional execution criteria and executable surveillance code configured to cause performance by a target processor unit of a specified surveillance action. The target processor unit is one of plural processor units comprising the system, with each of the processor units being configured to perform one or more operations with respect to a respective subset of plural communication channels. The surveillance element, when executed, permits continued transport of data over the plural communication channels.

In an example embodiment and mode of the computer program product the surveillance element is configured to be executed without disrupting performance of the one or more operations of the target processor unit with respect to the respective subset of plural communication channels and while other ones of the plural processor units perform the one or more operations with respect to their respective subsets of plural communication channels, and without modifying the instrumentation code during the execution of the surveillance element.

In an example embodiment and mode of the computer program product the pre-loaded instrumentation code is configured to receive multi-dimensional execution criteria inputs either before or after the onset of the communications over the plural communications channels.

In an example embodiment and mode of the computer program product the multi-dimensional execution criteria comprises: an indication of a target digital signal processor circuit upon which resides the target processor unit which executes the surveillance element; an indication of the target processor unit to execute the surveillance element; an indication of a target channel for surveillance; an indication of a trigger criteria to prompt execution of the surveillance element; an indication of the surveillance element-specified surveillance action; and, an indication of direction of a target channel for surveillance.

In an example embodiment and mode of the computer program product the pre-loaded instrumentation code is configured to generate the surveillance element to comprise a surveillance configuration table and executable surveillance code. The surveillance code is configured to cause performance by the target processor unit of the surveillance element-specified surveillance action, the surveillance configuration table being configured to store therein the multi-dimensional execution criteria. The executable surveillance code comprises instructions which are generic to plural surveillance elements created by the instrumentation code but supplied with information from the surveillance configuration table for facilitating the surveillance element-specified surveillance action.

In an example embodiment and mode the computer program product further comprises host application code executed on a host processor. The host application code is configured to receive a user command from the host processor. The user command includes information specifying an issue to be diagnosed. The host application code is further configured to translate the information specifying the issue to be diagnosed into the multi-dimensional execution criteria for use by the pre-loaded instrumentation code.

In an example embodiment and mode of the computer program product the pre-loaded instrumentation code is configured to generate the surveillance element to perform at least one of the following as the surveillance element-specified surveillance action: (1) monitoring data carried on a surveillance element-specified one of the communication channels comprising the respective subset; (2) changing (injecting or manipulating) data carried on the surveillance element-specified one of the communication channels comprising the respective subset; (3) redirecting execution by the target processor unit of the system operation code; (4) patching code by adding either a generic pre-defined or user-defined routine which is patched into the system code; (5) streaming out from the surveillance element-specified one of the communication channels comprising the respective subset to a surveillance channel; (6) performing a pre-defined debug action as the surveillance element-specified surveillance action; (7) performing a user-defined debug action as the surveillance element-specified surveillance action; and (8) initiating generation of another surveillance element as the surveillance element-specified surveillance action. The target processor unit in initiating the generation of the another surveillance element also specifies the multi-dimensional execution criteria for the another surveillance element.

In an example embodiment and mode of the computer program product the multi-dimensional criteria comprises an indication of a trigger criteria which, when satisfied, prompts execution of the surveillance element. An interrupt which results from an event that satisfies the trigger criteria may be accessible to or received by the plural processor units, but evokes a surveillance-element specified surveillance action only for selected ones of the plural processor units.

In an example embodiment and mode of the computer program product the multi-dimensional execution criteria comprises an indication of a trigger criteria. When an event occurs or is detected which meets the trigger criteria, an interrupt is generated to prompt execution of the surveillance element. In an example embodiment the system comprises a hardware circuit which generates an interrupt signal upon occurrence of a pre-defined circuit event (e.g., an event which satisfies the trigger criteria)

In an example embodiment and mode of the computer program product the pre-loaded instrumentation code is configured to generate and execute plural surveillance elements. As a result of executing of the plural surveillance elements, the computer program product generates data to facilitate performance characterization for a system comprising the target system.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 3-1 is a schematic view of a system comprising a communications entity which takes the form of a radio base station node.

FIG. 3-2 is a schematic view of a system comprising a communications entity which takes the form of a radio network controller (RNC) node.

FIG. 3-3 is a schematic view of a system comprising a communications entity which takes the form of a media gateway.

DETAILED DESCRIPTION

Figure 1:
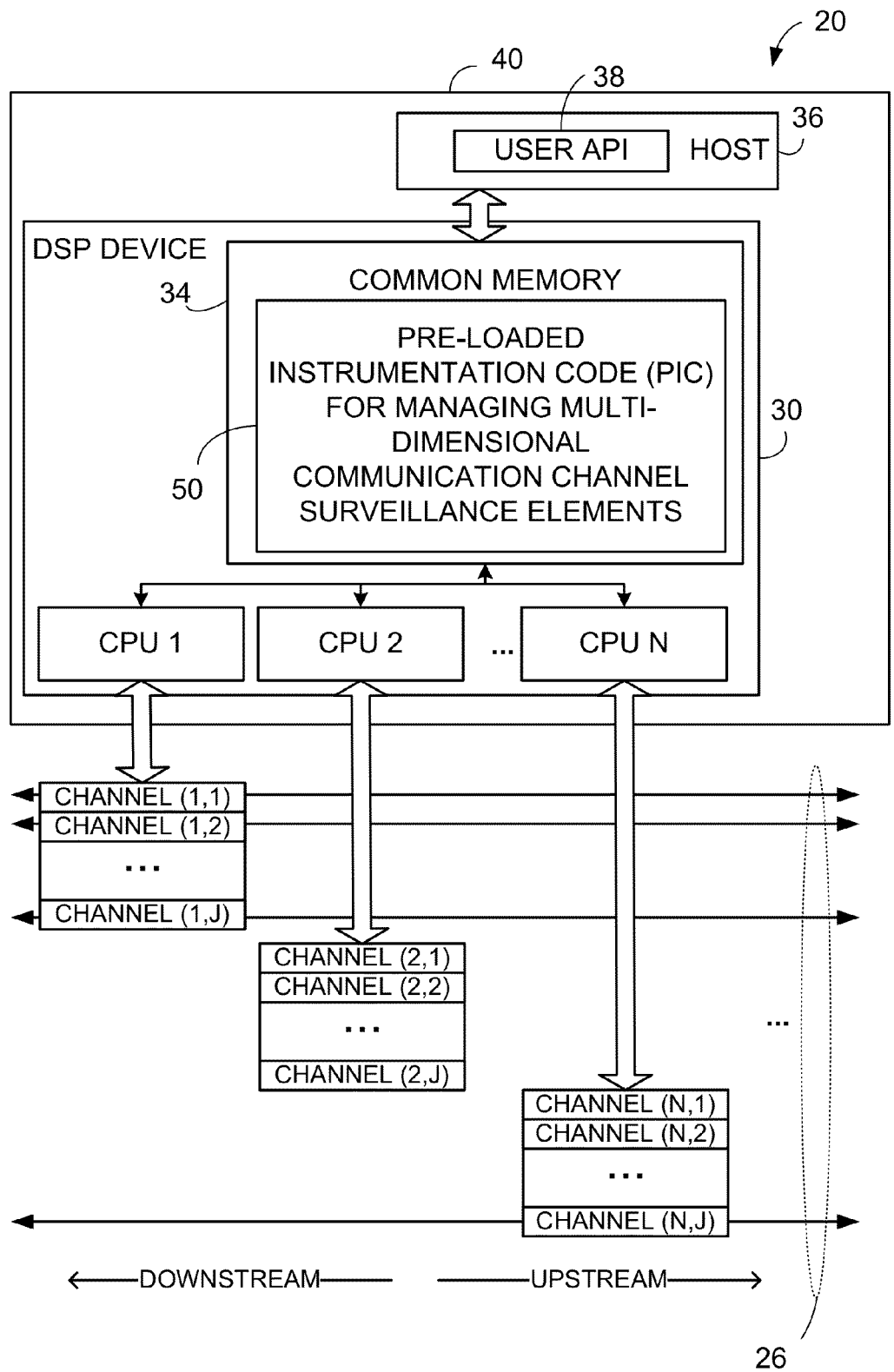
FIG. 1 is a schematic view of a basic system which comprises plural processor units and in which the plural processing units perform one or more operations with respect to a respective subset of plural communication channels.

In the following description, for purposes of explanation and not limitation, specific details are set forth such as particular architectures, interfaces, techniques, etc. in order to provide a thorough understanding of the technology disclosed herein. However, it will be apparent to those skilled in the art that the technology disclosed herein may be practiced in other embodiments that depart from these specific details. That is, those skilled in the art will be able to devise various arrangements which, although not explicitly described or shown herein, embody the principles of the technology disclosed herein and are included within its spirit and scope. In some instances, detailed descriptions of well-known devices, circuits, and methods are omitted so as not to obscure the description of the technology disclosed herein with unnecessary detail. All statements herein reciting principles, aspects, and embodiments of the technology disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

Communication System Architecture Overview

FIG. 1 shows a basic, example embodiment of a system 20 which comprises plural processor units CPU 1, CPU 2, . . . CPU N. Each of the processing units performs one or more operations with respect to a respective subset of plural communication channels. For example, CPU 1 performs an operation(s) on or for channels (1,1) through (1, J); CPU 2 performs an operation(s) on or for channels (2,1) through (2, J); and CPU N performs an operation(s) on or for channels (N,1) through (N, J). For sake of illustration, each channel is identified by a pair of elements (x,y), wherein the first element x of the pair corresponds to the number of the CPU (e.g., 1 through N) and the second element y of the pair corresponds to the channel number as handled by the respective processor unit (e.g., 1 through and including J). Collectively all channels handled by all processor units of the system 20 are depicted as channels 26.

As used herein, the term "processor unit" may also encompass a processor "core" or central processing unit. A processing unit executes coded instructions, typically obtained from program memory blocks, and operates on various registers and a silicon microcode sequencer comprising the processor unit.

In an example embodiment, the plural processor units CPU 0, CPU 1, . . . CPU N comprise, or are provided as or in conjunction with, collective processing unit 30. One non-limiting but common example of a collective processing unit 30 is a digital signal processing (DSP) device. For sake of simplification the 30 may herein also be referred to as the DSP device 30. A typical DSP device may host as many as any number of processing units, e.g., eight or sixteen being popular in some embodiments. Being a "collective" processing unit entails the plural processor units CPU 1, CPU 2, . . . CPU N having access to common memory 34. The common memory 34 is typically pre-loaded with system operation code to which each of the plural processor units have access and may execute, causing the plural processor units to perform operations including the one or more operations for their respective subset of plural communication channels.

In addition to collective processing unit 30, in an example embodiment the system 20 comprises host processor 36 which preferably is separate and distinct from the processing units of collective processing unit 30. Typically the host processor 36 includes an application programmable interface (API) 38 through which a user may interact with the host processor 36 by way of input/output devices such as keyboard, mouse, screen, etc.

One or more DSP devices 30 and the host processor 36 may be situated at or otherwise comprise a communications entity 40. The communications entity 40 may take the form of a node or server, for example, which performs one or more functions relative to the channels 26 handled by the processing units. The channels 26 may carry connections (e.g., "calls" or "sessions"), such as speech, data or video connections, for example, and the data and/or speech carried by such connections may be either upstream or downstream as indicated by the respective arrows in FIG. 1.

Essentially any communication-relevant operation may be performed by the processing units with respect to their respective subset of the communication channels 26. A non-exhaustive, example listing of such operations includes echo cancellation, transcoding between different types of coding at opposite ends of the connection; transcoding for video resolution; and protocol conversion with respect to different data protocols at the opposite ends of the connection.

From time to time, or at any particular point in time, it may be desirable to monitor or investigate the performance or characteristics of one or more of the communication channels 26. Such monitoring or investigating may include gathering information, and even taking actions for resolving, suspected problem or error conditions on the communication channels 26 themselves or reflected by the traffic on the communication channels 26. To this end, the technology disclosed herein provides, as one of its many aspects, pre-loaded instrumentation code (PIC) 50. The pre-loaded instrumentation code (PIC) 50 is pre-loaded into the common memory 34. As described herein, pre-loaded instrumentation code (PIC) 50 serves to manage multi-dimensional communication channel surveillance elements. These surveillance elements facilitate the provision of information or intelligence, and even implementation of corrective action when desired, for or with respect to the communication channels 26.

Figure 2:
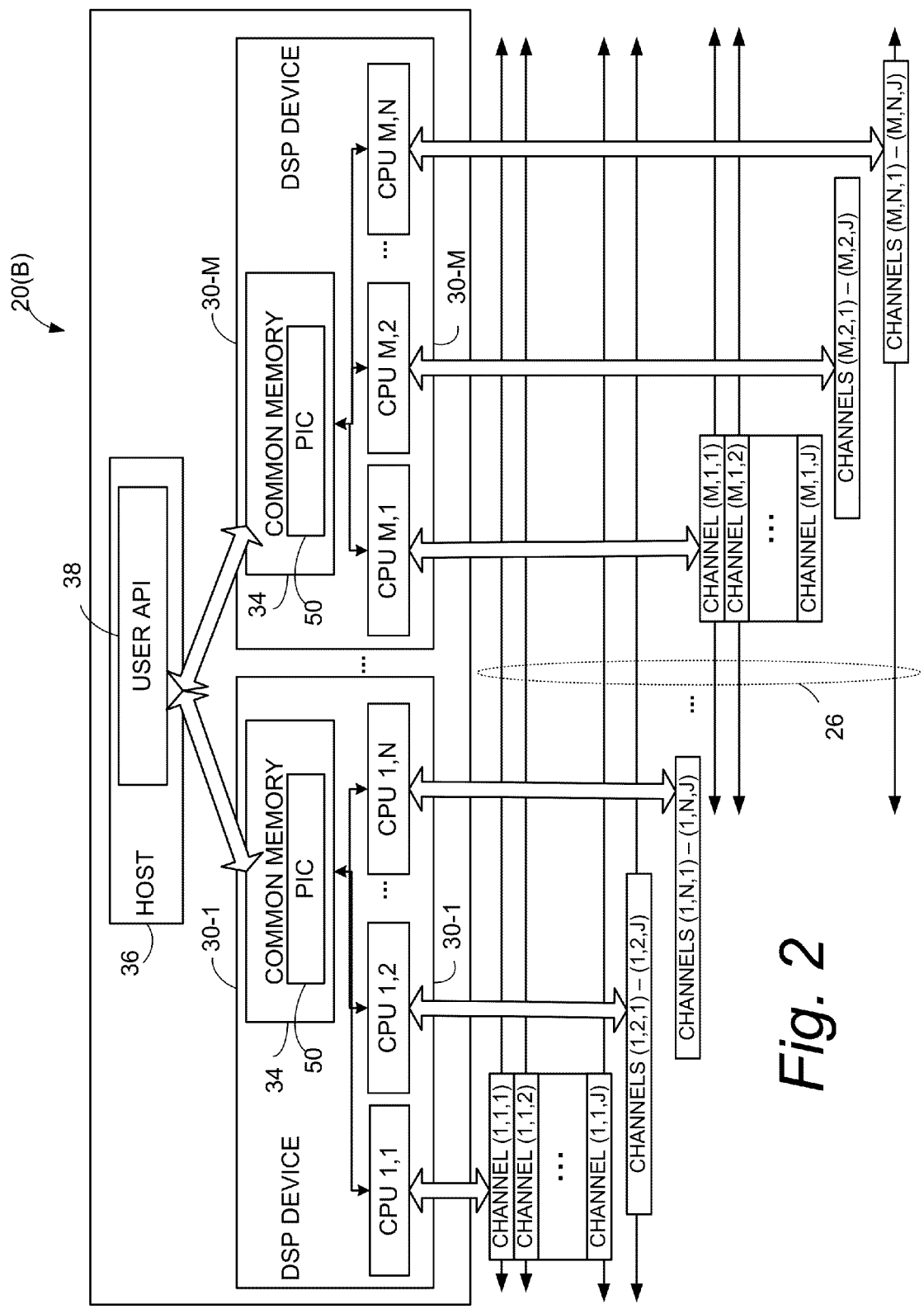
FIG. 2 is a schematic view of a system which comprises plural collective processing units, each collective processing unit in turn comprising plural processing units which perform one or more operations with respect to a respective subset of plural communication channels.

Before describing in more detail the structure and operation of pre-loaded instrumentation code (PIC) 50, it should first be noted that there are many types of systems in which the pre-loaded instrumentation code (PIC) 50 may be implemented. FIG. 1 happens to generically represent a system comprising a collective processing unit taking the form of a single DSP device 30. FIG. 2 illustrates another system 20(B) comprising plural collective processing units, e.g., plural DSP devices 30-1 through 30-M, each handling plural communication channels. Each DSP device 30-1 through 30-M of FIG. 2 comprises its plural processing units (CPUs) as well as its common memory 34, with the pre-loaded instrumentation code (PIC) 50 being pre-loaded into the common memory 34. Each of the processing units of a DSP device have access to the common memory 34 included in/on the DSP device.

For sake of illustration, in FIG. 2 each channel is identified by a triad of elements (w, x, y), wherein the first element w of each triad is the suffix number of the DSP device (e.g., 1 through M); the second element x of the triad corresponds to the number of the CPU (e.g., 1 through N) of the DSP device 30; and the third element y of the triad corresponds to the channel number as handled by the respective processor unit (e.g., 1 through and including J). Once again, collectively all channels handled by all processor units of the system 20(B)

are depicted as channels 26. Similarly, each CPU of the FIG. 2 system 20(B) is identified by a pair of identifiers (w, x), the first identifier again being the suffix number of the DSP device (e.g., 1 through M) and the second element x of the pair corresponding to the number of the CPU (e.g., 1 through N) of the DSP device 30-w.

Figures 1, 3:
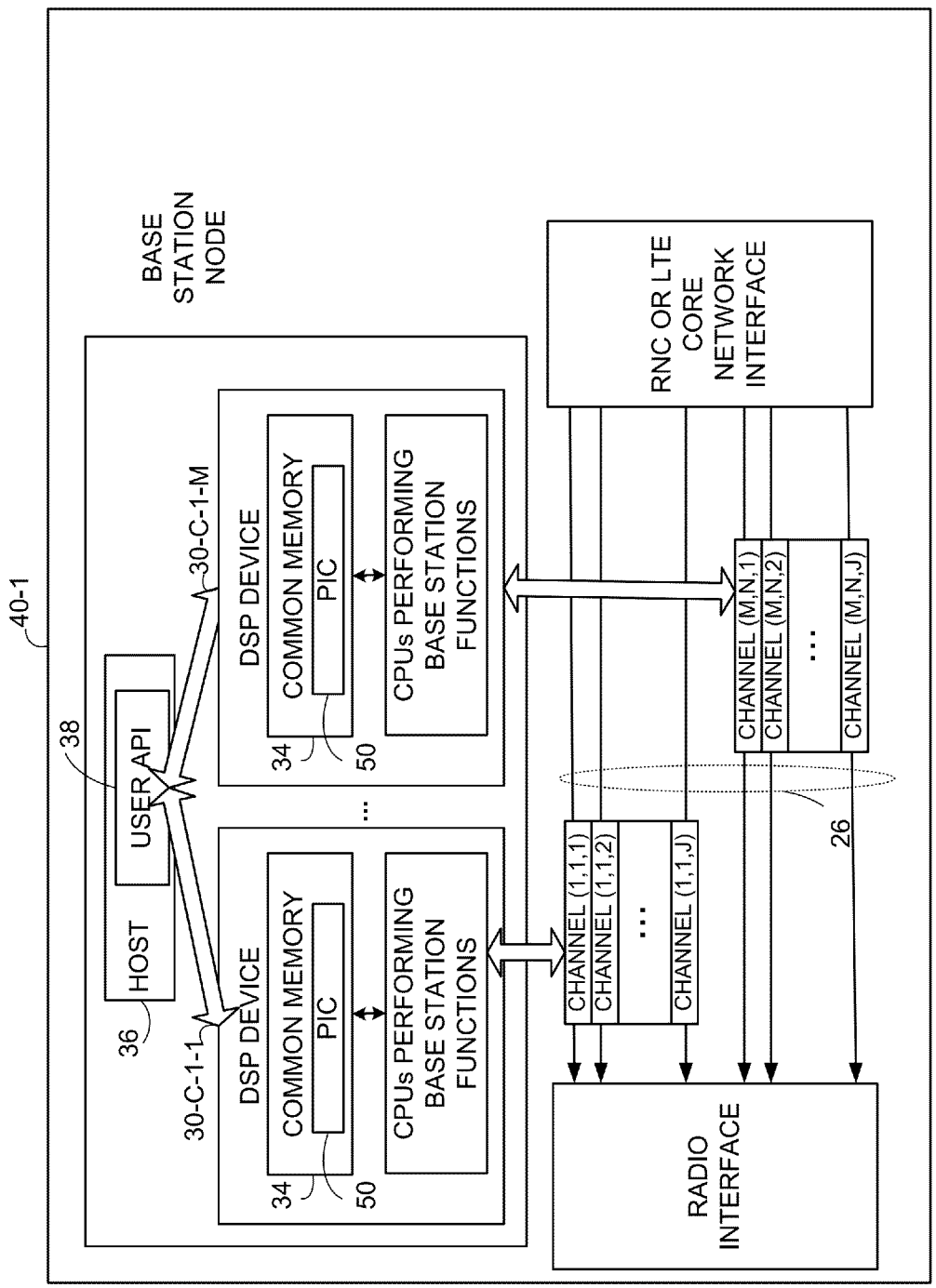
Figures 2, 3:
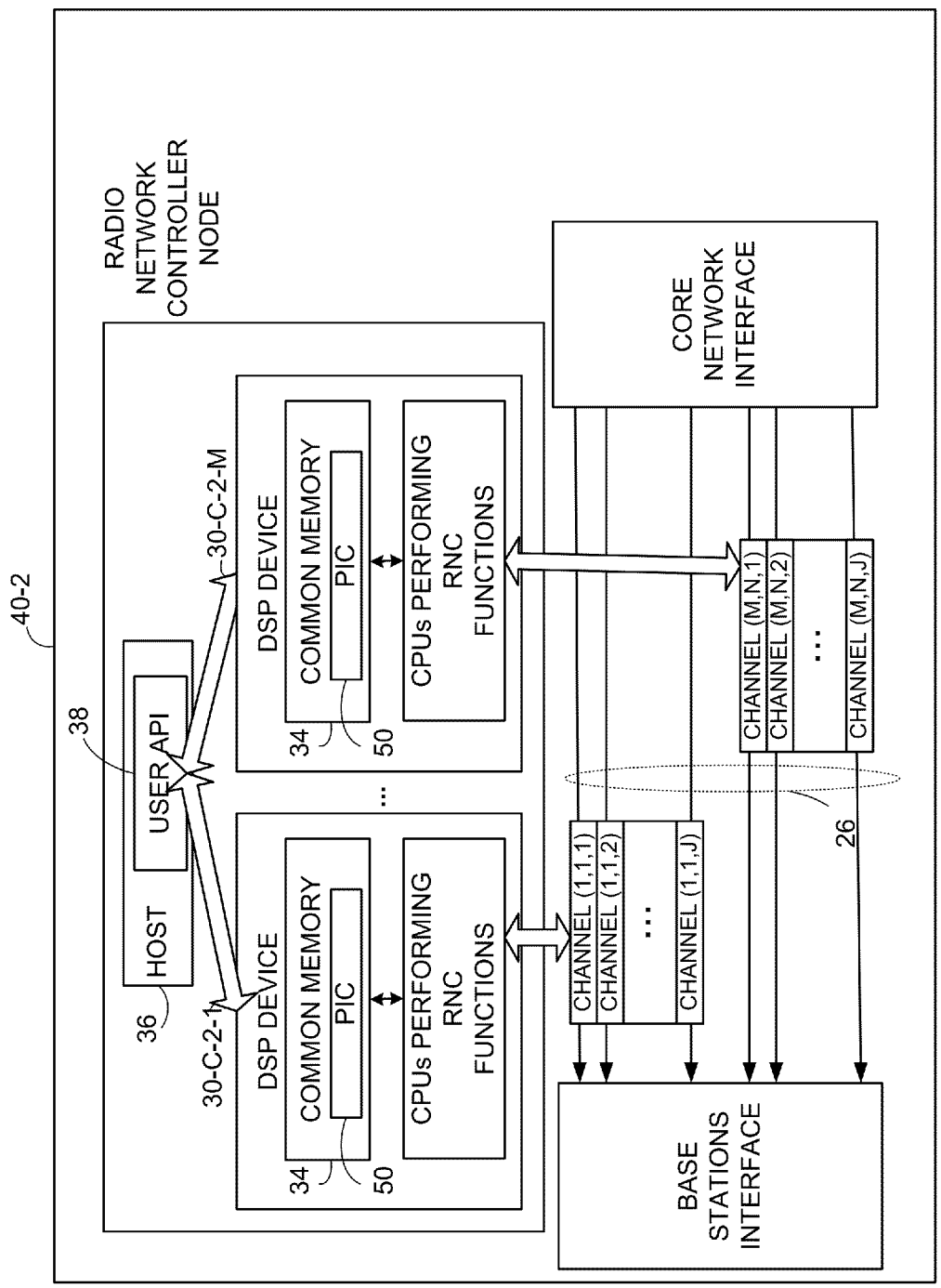
Figure 3:
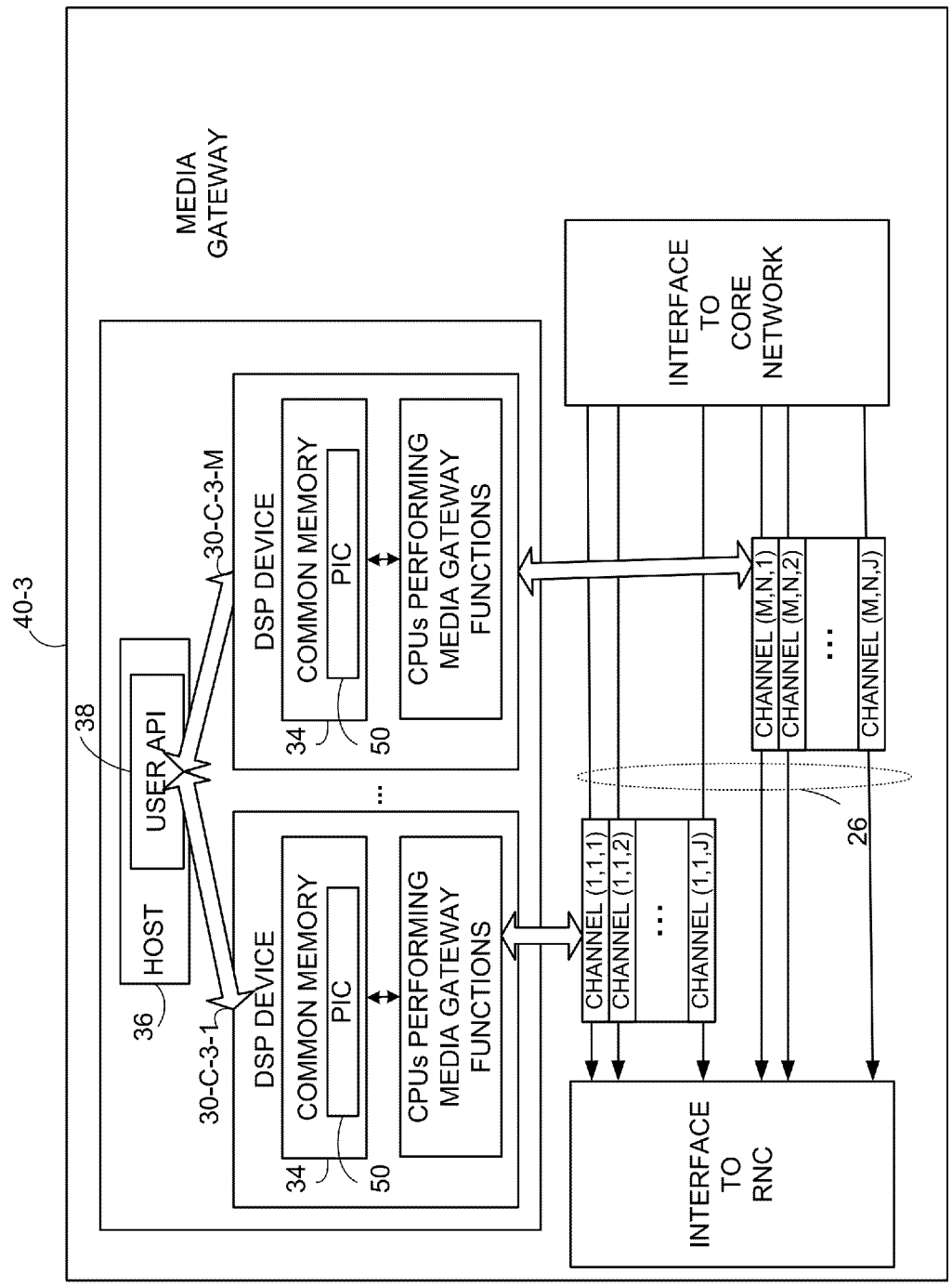

Moreover, as mentioned above, communications entity 40 may take the form of a node or server which performs one or more functions relative to the channels 26 handled by the processing units. By way of non-limiting example, FIG. 3-1 illustrates communications entity 40-1 as a radio base station node; FIG. 3-2 illustrates communications entity 40-2 as a radio network controller (RNC) node; and FIG. 3-3 illustrates communications entity 40-3 as a media gateway. These differing embodiments of communications entity 40 are discussed further subsequently. While these particular incarnations of the communications entity represent nodes of a radio access network or a server of a core network providing telecommunications services, it should be understood that the technology disclosed herein is not confined to any particular type of network or communications services, and is indeed applicable to any multi-channel information or communications transmission system.

Common Memory

Figure 4:
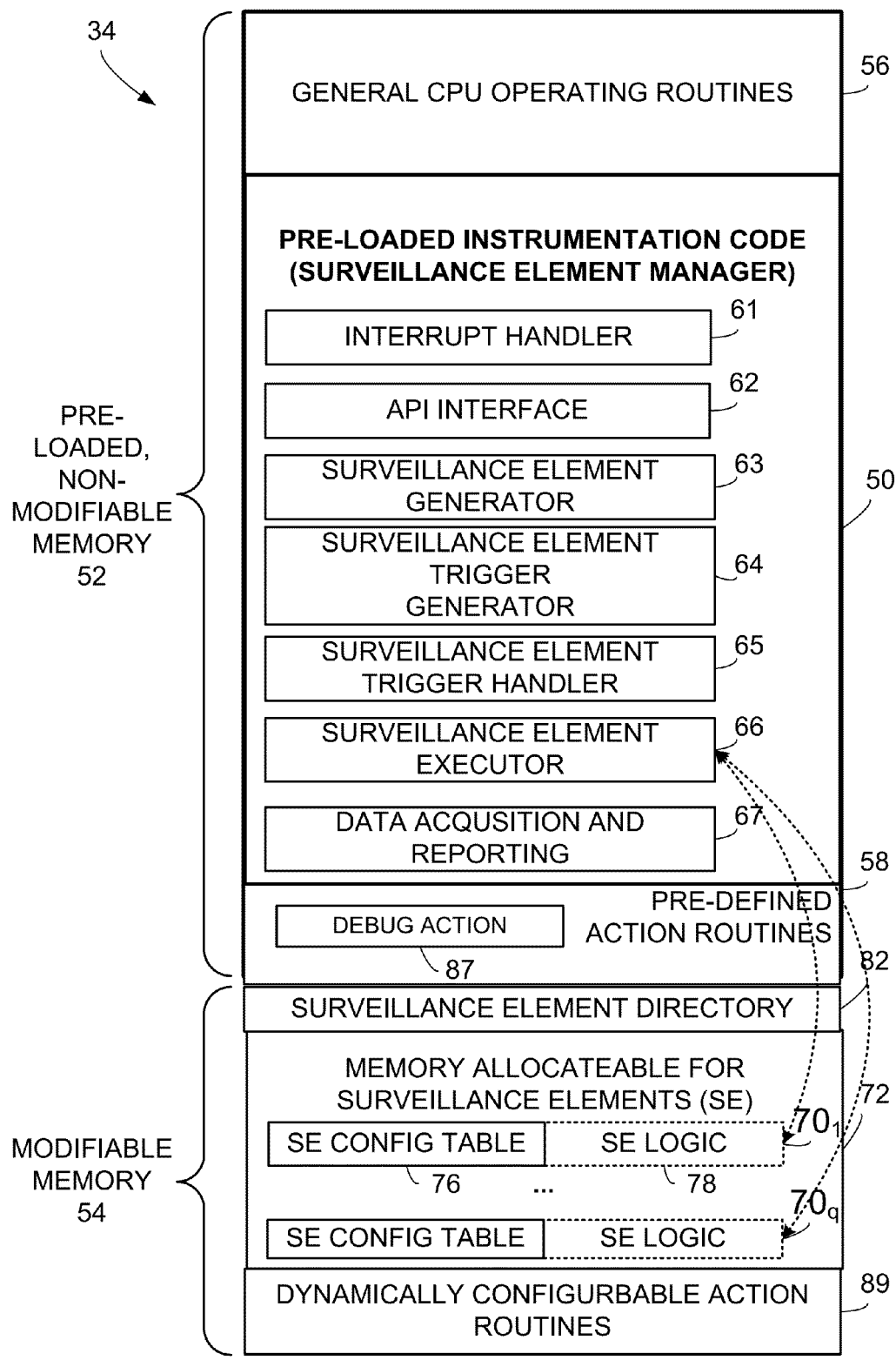
FIG. 4 is a diagrammatic view depicting example structure and/or organization of a common memory according to an example, non-limiting embodiment.

FIG. 4 shows example structure and/or organization of common memory 34 according to an example, non-limiting embodiment. The common memory 34 can be conceptualized as being divided into different portions, including pre-loaded, non-modifiable memory portion 52 and modifiable memory portion 54. The pre-loaded, non-modifiable memory portion 52 is essentially pre-loaded into common memory 34 and executed, but is not modified, revised, or updated during the execution. Typically the pre-loaded, non-modifiable memory portion 52 is preloaded at the same time that the communications entity 40 is powered up or restarted. The non-modifiable memory portion 52 executed in conjunction with the continual, non-interrupted operation of communications entity 40. Therefore, execution of pre-loaded, non-modifiable memory portion 52 is not terminated nor is its code modified during the normal operation of communications entity 40.

The pre-loaded, non-modifiable memory portion 52 includes general CPU operating routines 56, also herein known as system operation code, and pre-defined action routines 58. The system operation code is configured to cause each of the plural processor units to perform one or more operations, such as those example operations mentioned herein. As previously described, each of the processor units is configured to perform its one or more operations with respect to a respective subset of plural communication channels 26. The pre-defined action routines 58 are pre-coded exploratory, diagnostic, debug, or repair functions or subroutines which may be called or invoked during operation of the pre-defined action routines 58.

Pre-Loaded Instrumentation Code (PIC)

As mentioned above, pre-loaded instrumentation code (PIC) 50 is loaded into common memory 34 at startup or re-start of the communications entity 40. The pre-loaded instrumentation code (PIC) 50 is also known as a "surveillance element manager" since the pre-loaded instrumentation code (PIC) 50 serves to generate and execute "surveillance elements" as described herein. The pre-loaded instrumentation code (PIC) 50 includes various coded components or routines, some of which are illustrated in FIG. 4. In this regard FIG. 4 specifically shows pre-loaded instrumentation code (PIC) 50 as comprising interrupt handler 61; API interface 62; surveillance element generator 63; surveillance element trigger generator 64; surveillance element trigger handler 65; surveillance element executor 66; and, data acquisition and reporting unit 67.

PIC: Surveillance Element

FIG. 4 shows plural surveillance elements $70_1$ through $70_q$ which are stored in surveillance element library 72 of modifiable memory portion 54 of common memory 34. The surveillance element library 72 is also known as memory allocatable for surveillance elements. A surveillance element 70 comprises both multi-dimensional execution criteria 76 and executable surveillance code 78. In FIG. 4 the multi-dimensional execution criteria is depicted by the surveillance element configuration table 76 ("SE CONFIG TABLE") of the surveillance element 70, which is stored in surveillance element library 72. The executable surveillance code of a surveillance element 70 is depicted by 78 ("SE LOGIC"). The executable surveillance code or SE LOGIC 78 is actually stored in the surveillance element executor 66 of the pre-loaded instrumentation code (PIC) 50, for which reason the executable surveillance code or SE LOGIC 78 for each surveillance element 70 is shown by broken lines in FIG. 4. Thus, while FIG. 4 shows a surveillance element 70 as comprising both the surveillance element configuration table 76 ("SE CONFIG TABLE") and the executable surveillance code or SE LOGIC 78, only the surveillance element configuration table 76 ("SE CONFIG TABLE") is stored within the surveillance element library 72. Each surveillance element 70 is supplied with information from its surveillance configuration table 76 for facilitating association of the surveillance element 70 with appropriate generic code stored in surveillance element executor 66, the execution of the generic code enabling the surveillance element 70 to perform the surveillance action specified by the multi-dimensional execution criteria for that new surveillance element 70.

As described herein, the multi-dimensional execution criteria of surveillance element 70 (the configuration table of the surveillance element 70) includes input information necessary for determining when the surveillance element 70 is to be executed, e.g., a specific criteria which triggers execution of surveillance element 70. Among the multi-dimensional execution criteria is a designation of which processing unit is to execute the surveillance element 70. In addition, the multi-dimensional execution criteria includes input information which specifies what nature and extent of surveillance action(s) are to be performed as a result of execution of surveillance element 70. The surveillance element logic 78 is the actual code (e.g., the encoded executable instructions) which comprises surveillance element executor 66 and which, when executed by the target processing unit, causes the surveillance element 70 to perform its surveillance actions.

In alternative embodiments a person of skill in the art may choose to locate the elements illustrated in FIG. 4 in either one of pre-loaded non-modifiable memory and modifiable memory differently than as illustrated in the example embodiment of FIG. 4, and any such alternatives are contemplated by the inventors to be within the scope of this disclosure.

Figure 5:
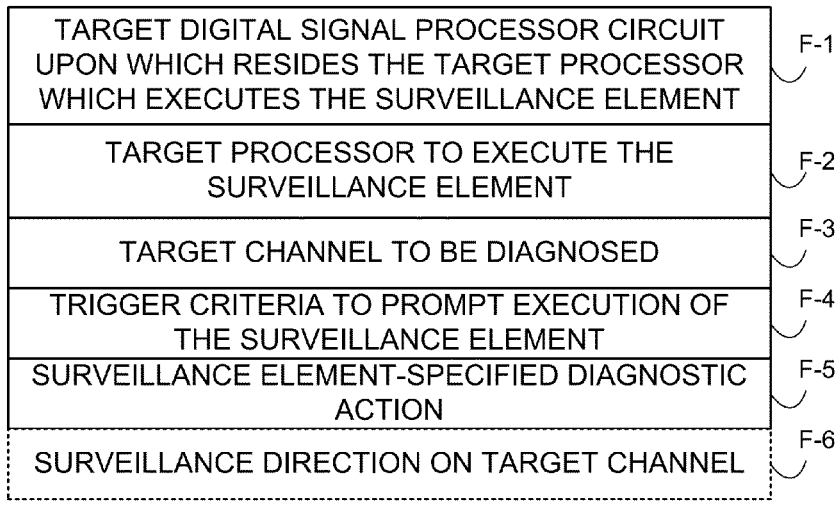
FIG. 5 is a diagrammatic view showing contents of an example surveillance element configuration table for a surveillance element.

FIG. 5 illustrates contents of an example surveillance element configuration table 76, e.g., the multi-dimensional execution criteria associated with an example surveillance element 70. In the example of FIG. 5 the surveillance element configuration table 76 comprises information elements or fields for the following information or identifications, each of which is also referred to herein as one of the "multi-dimensional execution criteria":

an indication of a target digital signal processor circuit or DSP device 30 upon which resides the target processor unit which executes the surveillance element (field F-1 in FIG. 5);

an indication of the target processor unit (on the DSP device 30 specified in the previous field) to execute the surveillance element (field F-2 in FIG. 5);

an indication of a target channel for surveillance (field F-3 in FIG. 5);

an indication of a trigger criteria which, when satisfied, prompts execution of the surveillance element (field F-4 in FIG. 5);

an indication of the surveillance element-specified surveillance action (field F-5 in FIG. 5); and (optionally)

an indication of which direction of traffic flow (e.g., upstream or downstream) on the target channel is the subject of surveillance (field F-6 in FIG. 5).

Figure 6:
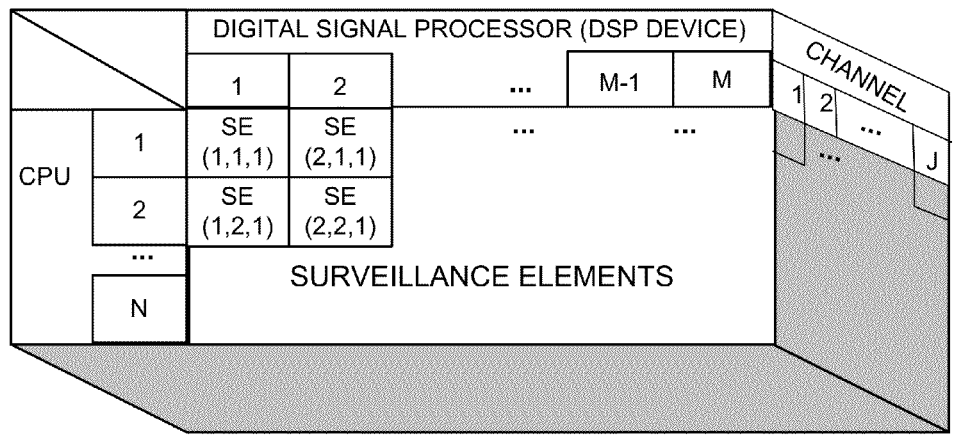
FIG. 6 is a diagrammatic view showing a non-limiting example representation of a surveillance element in three dimensional space.

The multi-dimensional execution criteria is said to be "multi-dimensional" in the sense, e.g., that plural levels or types of information may be necessary to determine what particular communication channel 26 is the target of the surveillance. The multi-dimensional nature of the execution criteria for a surveillance element 70 is illustrated by FIG. 6, which as a non-limiting example provides a representation of the library 72 of surveillance elements 70 in three dimensional space. In the FIG. 6 depiction a first dimension corresponds to a DSP device 30 (and to field "w" in FIG. 2); a second dimension corresponds to a processing unit (and to field "x" in FIG. 2); and a third dimension corresponds to a channel number (and to field "y" in FIG. 2). It should be realized that the number of dimensions is not confined to three, but can be a greater number. As described herein, the surveillance element 70 facilitates non-intrusive data access in a multi-dimensional manner since the access is provided selectively at least per targeted processing device, CPU core, user session, or call context. This is particularly advantageous when dealing with high-capacity telecommunication systems or with multi-user applications in general.

The surveillance element 70 itself is said to be multi-dimensional not only in the fact that multi-dimensional execution criteria may be necessary for identifying the surveillance element 70, but also in having an associated trigger and surveillance action (since the target channel could be subject to plural surveillance elements, each with different trigger criteria and different resultant actions in different downstream and upstream directions).

While various example dimensions for the multi-dimensional execution criteria have been provided above, it should be understood that the constituent dimensions of the multi-dimensional execution criteria may be user-defined.

PIC: Operation Overview

Figure 7:
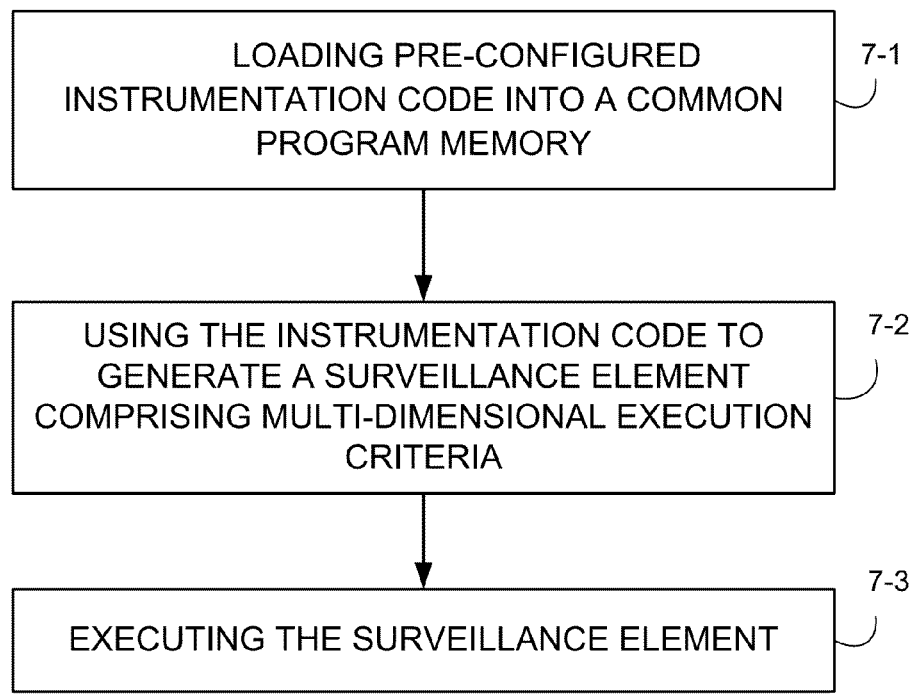
FIG. 7 is a flowchart illustrating example, representative basic acts or steps performed in conjunction with a method according to the technology disclosed herein.

FIG. 7 illustrates example, representative basic acts or steps performed in conjunction with a method according to the technology disclosed herein. Act 7-1 comprises loading the pre-loaded instrumentation code (PIC) 50 into common memory 34 of each DSP device 30. After being loaded, the instrumentation code 50, along with system operation code 56 in the memory device, is accessible and executable by the plural processor units of the DSP device 30. In an example, non-limiting embodiment such loading of the pre-loaded instrumentation code (PIC) 50 takes place before the communications entity 40 (which houses the DSP device 30 upon which pre-loaded instrumentation code (PIC) 50 executes) is placed into active service, that is, before the communications entity 40 begins to serve active communications traffic, and before the onset of communications over the plural communication channels.

Act 7-2 comprises using the pre-loaded instrumentation code (PIC) 50 to generate a surveillance element 70. The surveillance element 70 may be generated before or after the onset of the communications over the plural communication channels and during execution of the system operation code 56 by the plural processor units. As mentioned above, the surveillance element 70 comprises multi-dimensional execution criteria 76 and executable surveillance code 78 configured to cause performance by a target processor unit of a surveillance element-specified surveillance action.

Act 7-3 comprises executing the surveillance element 70 by the target processor unit. Execution of the surveillance element 70 causes performance by the target processor unit of the surveillance element-specified surveillance action which is input as one of the multi-dimensional execution criteria. In an example, non-exhaustive implementation the execution of the surveillance element 70 by the target processor unit may occur in the context of performance by the target processor unit of its one or more operations performed with respect to the respective subset of plural communication channels, thereby permitting continued transport of data over the plural communication channels during the execution of the surveillance element 70.

PIC: Operation: Interaction with Host

Figure 8:
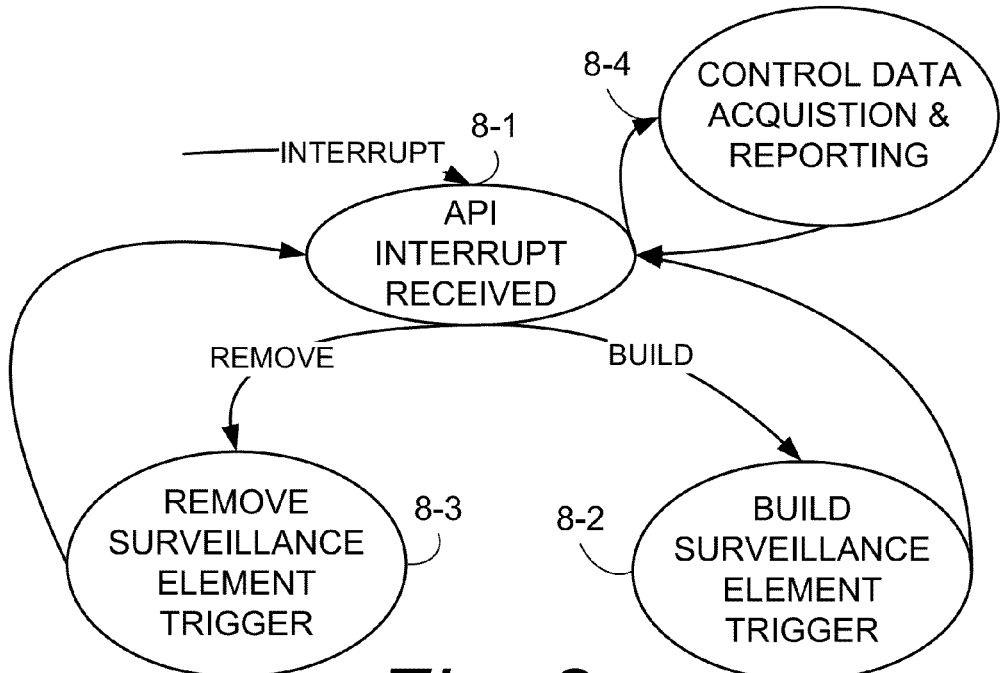
FIG. 8 is a flowchart illustrating example acts or steps performed by a surveillance program executed on a host processor for initiating generation or removal of a surveillance element.

Acts of FIG. 7 are discussed below in more detail. Before doing so, brief discussion is provided regarding an example embodiment of host processor 36. As mentioned previously, the pre-loaded instrumentation code (PIC) 50 interacts with host processor 36 application programmable interface (API) 38. The host processor 36 has stored in its program memory a surveillance program 80. The host processor 36 and particularly its surveillance program 80 (see FIG. 13) is configured to initiate generation and, when appropriate, removal of a surveillance element 70 from the pre-loaded instrumentation code (PIC) 50. FIG. 8 shows example acts or steps performed by surveillance program 80 executed on host processor unit 36 for initiating generation or removal of surveillance element 70. Act 8-1 comprises the surveillance program 80 receiving an interrupt from the application programmable interface (API) 38 (indicative of an operator-initiated input). Act 8-1 further discriminates between an interrupt prompting generation of a surveillance element and an interrupt prompting removal of a surveillance element. If the interrupt prompts generation of a surveillance element, as act 8-2 the surveillance program 80 executes code to interact with the operator through application programmable interface (API) 38 in order to elicit information suitable for building or generating the surveillance element, as described below with reference to FIG. 9. If the interrupt prompts removal of a surveillance element, as act 8-3 the surveillance program 80 executes code to interact with the operator through application programmable interface (API) 38 in order to elicit information suitable for such removal.

Figure 9:
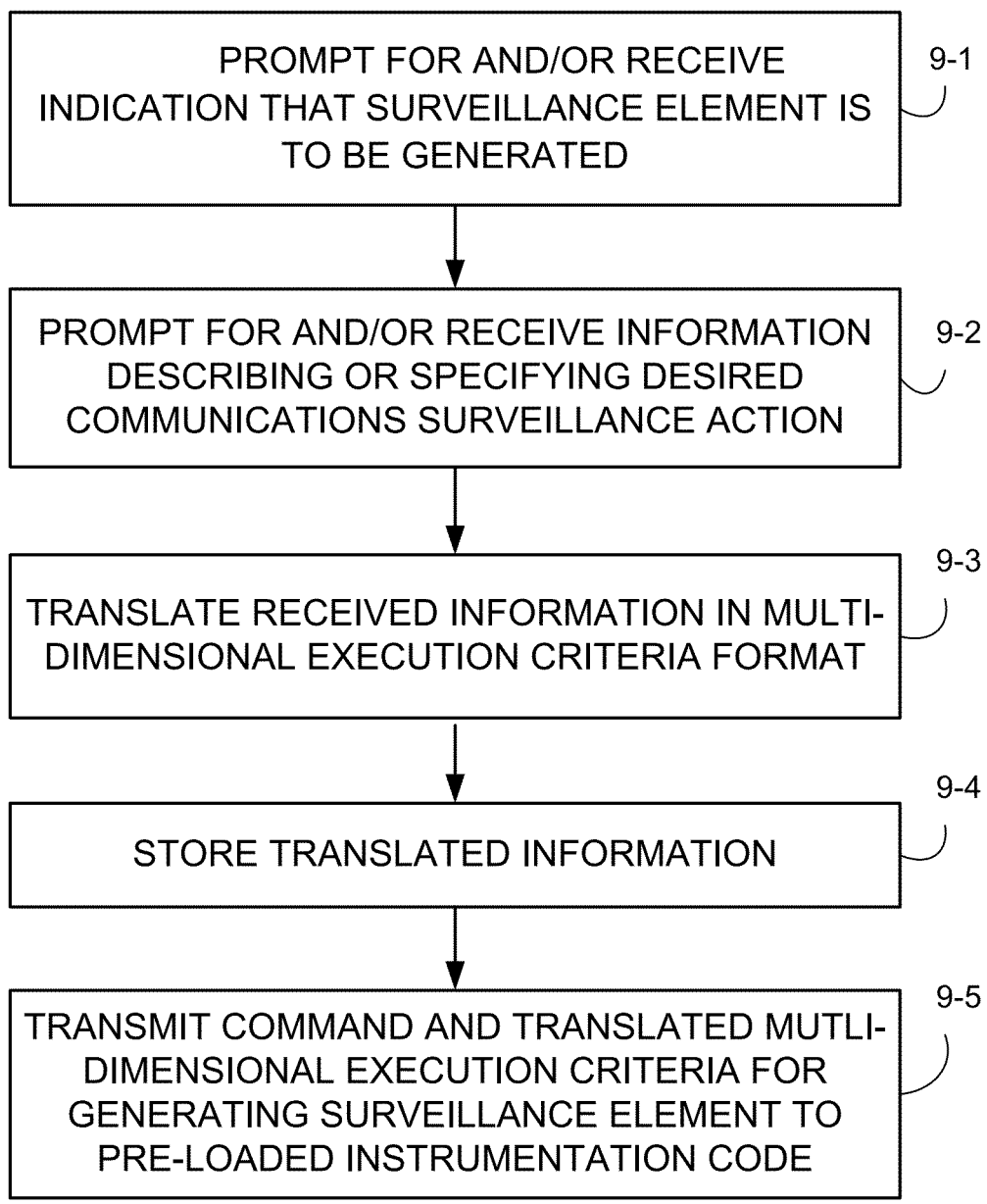
FIG. 9 is a flowchart illustrating example acts or steps that may be performed by a host processor initiating generation of a surveillance element.

FIG. 9 illustrates how, from a vantage point of an operator at host processor 36, generation of a surveillance element 70 by pre-loaded instrumentation code (PIC) 50 is initiated. FIG. 9 specifically illustrates certain acts or steps that may be performed by host processor 36 for initiating generation of a surveillance element 70 for pre-loaded instrumentation code (PIC) 50. Through application programmable interface (API) 38 and using host application code or program such as surveillance program 80 (FIG. 13), an operator of the system 20 may, either because of curiosity or concern, decide to investigate a particular phenomena or event in the system and, for that purpose, take actions that result in creation of a surveillance element 70. To that end, using the application programmable interface (API) 38, as act 9-1 the surveillance program 80 gives the operator an opportunity to specify that a surveillance element 70 is to be created (chosen among other options or capabilities provided at API 38). As act 9-2, the surveillance program 80 presents one or more prompts for the operator to enter information describing or otherwise specifying a communications surveillance action that is desired. Act 9-1 and act 9-2 thus collectively represent or depict the host processor unit (e.g., host processor 36) receiving a user command including information specifying an issue to be diagnosed.

Some of the prompts and/or information entered may correspond to some of the previously described multi-dimensional execution criteria, including some of those multi-dimensional execution criteria illustrated in FIG. 5. However, in some instances the operator may not know, for example, what particular DSP device or what particular processing unit handles a certain target channel. In such case the operator may identify a target channel by other nomenclature or convention other than that depicted, for example, by the triad of elements described in conjunction with FIG. 2. Therefore, as act 9-3 the surveillance program 80 translates the information obtained from the operator in act 9-2 so that such obtained information will be usable by the pre-loaded instrumentation code (PIC) 50. For example, as act 9-3 the surveillance program 80 may store the information received in act 9-2 in the multi-dimensional execution criteria format usable by pre-loaded instrumentation code (PIC) 50.

As act 9-4 the surveillance program 80 stores the information obtained in response to the prompts of act 9-2 (either before or after translation at act 9-3). As act 9-5 the surveillance program 80 generates a command to the pre-loaded instrumentation code (PIC) 50 to create or generate a new surveillance element 70 using the information elicited during act 9-2.

As an example scenario, an operator may detect a certain problem on a given channel C, such as a raspy voice. However, the operator may not know what DSP device 30 or what processing unit on DSP device 30 handles the channel C. For such a situation the surveillance program 80 makes the translation of act 9-3, using a table or other information to convert the operator-input channel designation into a format that the pre-loaded instrumentation code (PIC) 50 can understand.

In addition to the multi-dimensional execution criteria depicted in FIG. 5, the operator may also enter other information germane to the particular surveillance element desired for creation, including any parameters or ranges associated with any of the multi-dimensional execution criteria. It should be understood that upon entering the multi-dimensional execution criteria or other information that the surveillance program 80 may prompt for further information for refining the initial entry or providing the operator with options for limiting or tailoring a certain aspect of the multi-dimensional execution criteria.

The API interface 62 (FIG. 4) of pre-loaded instrumentation code (PIC) 50 is involved in receiving the command from surveillance program 80 (FIG. 13) of host processor 36 to generate a new surveillance element 70. Upon receiving a command such as the command of act 9-5 to generate a new surveillance element 70, the command and its associated multi-dimensional execution criteria are transmitted to surveillance element generator 63 (FIG. 4). The pre-loaded instrumentation code (PIC) 50 implements act 7-2 using, at least in part, the surveillance element generator 63.

PIC: Operation: Surveillance Element Generation

Figure 10:
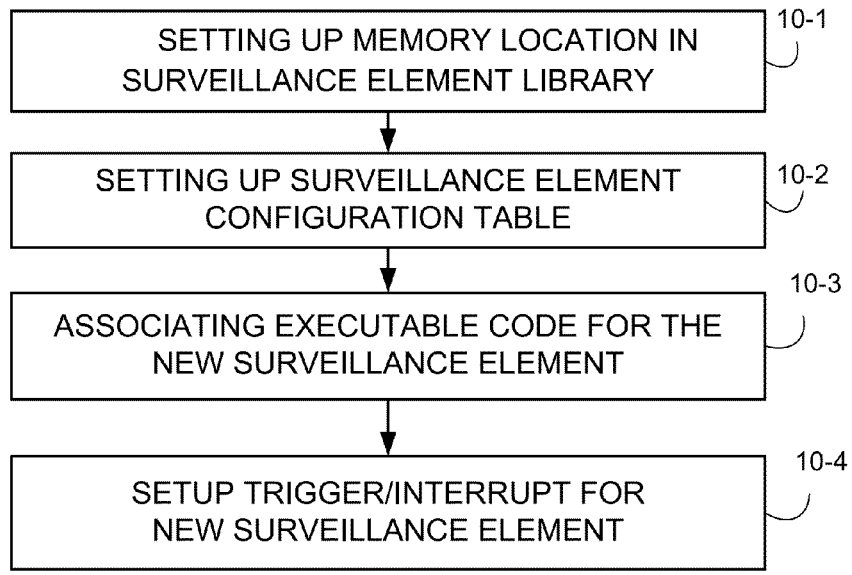
FIG. 10 is a flowchart illustrating example acts or steps performed by a surveillance element generator in generating a new surveillance element according to an example embodiment and mode.

Example acts performed by surveillance element generator 63 (see, e.g., FIG. 4) in generating a new surveillance element 70 are depicted in FIG. 10. Act 10-1 comprises the surveillance element generator 63 setting up or reserving a memory location in surveillance element library 72 (see, e.g., FIG. 4) for the new surveillance element 70. If a directory such as surveillance element directory 82 is maintained for surveillance element library 72, information describing the new surveillance element 70 and its memory address in surveillance element library 72 may be entered into the surveillance element directory 82. Act 10-2 comprises the surveillance element generator 63 setting up or loading the surveillance element configuration table 76 with, e.g., the multi-dimensional execution criteria type information for the new surveillance element 70, as obtained either from the surveillance program 80 executed by host processor 36 or as obtained by the pre-loaded instrumentation code (PIC) 50 itself from other information gleaned at least partially from the input of surveillance program 80. Thus as act 10-2 the surveillance element generator 63 generates a new surveillance element 70 by creating and configuring another entry 76 in surveillance element library 72. Upon creation of this new entry 76 in surveillance element library 72, as act 10-3 the surveillance element generator 63 associates the appropriate executable surveillance code 78 with the new surveillance element 70, the executable surveillance code 78 being a common routine for each and every same type surveillance element 70. Thus the executable surveillance code 78 comprises pre-loaded memory 52, and as mentioned before for that reason the inclusion of executable surveillance code 78 in a surveillance element is shown in FIG. 4 by broken lines.

As act 10-4 the surveillance element generator 63 instructs the surveillance element trigger generator 64 to set up an interrupt or trigger for the new surveillance element 70. Preferably the interrupt or trigger is set up for the target processing unit which will execute the surveillance element 70 and not for other processing units of the same DSP device 30, although those other processing units may have same or similar interrupts for other purposes or other surveillance elements.

Figure 11:
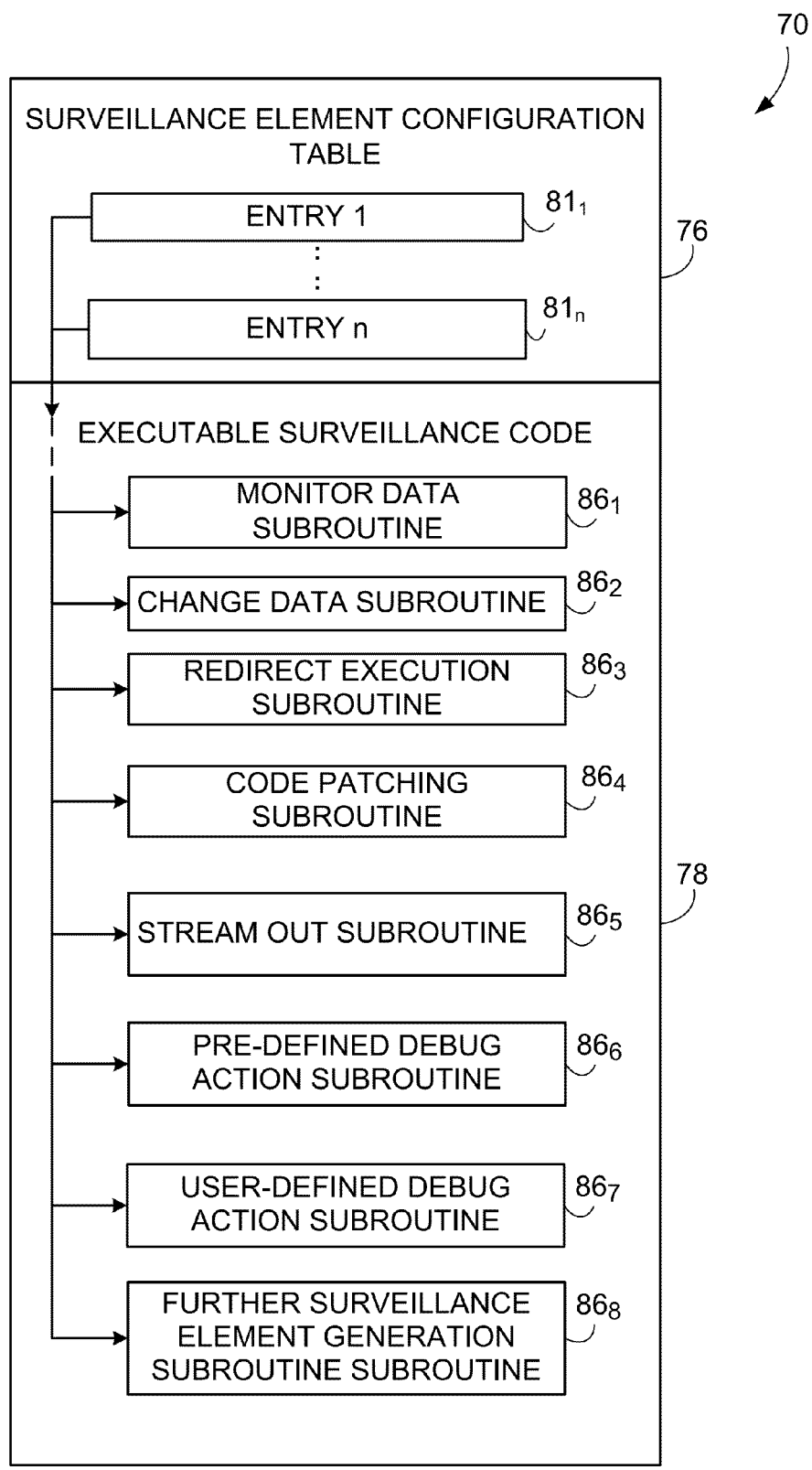
FIG. 11 is a diagrammatic view showing example structure or organization for a surveillance element including executable surveillance code for an example embodiment.

FIG. 11 shows, in more detail than FIG. 4, example structure or organization for a surveillance element 70. As mentioned above, surveillance element 70 comprises surveillance configuration table 76 and the executable surveillance code 78. As mentioned above, as act 10-2 the surveillance element generator 63 stored the multi-dimensional execution criteria in the surveillance element configuration table 76. For the example surveillance element 70 illustrated in FIG. 11, surveillance element configuration table 76 contains multiple entries $81_1$-$81_n$ (individually or collectively referred to as entry 81) which are used to locate the surveillance element-specified surveillance action in the surveillance element configuration table 76.

It is the executable surveillance code 78 which is configured to cause performance by the target processor unit of the surveillance element-specified surveillance action. As mentioned above, in an example embodiment and mode, the executable surveillance code 78 comprises instructions which are stored in pre-loaded, non-modifiable memory 52 and which are generic to plural (e.g., other) surveillance elements created by surveillance element generator 63. However, each newly generated surveillance element 70 is supplied with information from its surveillance configuration table 76 for associating or using the executable surveillance code 78 and thereby facilitating the surveillance action specified by the multi-dimensional execution criteria for that new surveillance element 70.

In general, the code sub-sections or code subroutines 86 correspond to the surveillance action requested for the surveillance element 70 in accordance with its multi-dimensional execution criteria as stored in or fetched from surveillance element configuration table 76. Thus, based on the content of the multi-dimensional execution criteria and particularly the surveillance element-specified surveillance action, execution of the routing entry 81 causes the execution performed by the target processing unit to jump or go to the appropriate one of the code subroutines 86. In performance of act 10-3 (see FIG. 10) the surveillance element generator 63 configures routing entry 81 so that the routing or branch occurs to the appropriate one of the code subroutines 86.

Example code subroutines 86 included in the executable surveillance code 78 are illustrated in FIG. 11 include monitor data subroutine $86_1$; change data subroutine $86_2$; redirect execution subroutine $86_3$; stream out subroutine $86_4$; pre-defined debug action subroutine $86_5$; user-defined debug action subroutine $86_6$; and, further surveillance element generation subroutine $86_7$. Each of these code subroutines 86 are discussed briefly below, and some are illustrated by example operational scenarios provided herein.

The monitor data code subroutines $86_1$ serves to monitor data carried on a surveillance element-specified one of the communication channels comprising the respective subset for the target processing unit.

The change data subroutine $86_2$ serves to change (e.g., inject or manipulate) data carried on the surveillance element-specified one of the communication channels comprising the respective subset for the target processing unit.

The redirect execution subroutine $86_3$ redirects execution by the target processor unit of the system operation code.

The code patching subroutine $86_4$ inserts or "patches" into the system memory a user-defined routine. User-defined routines are patched into modifiable system memory 54 by means of host 36 API 38. User-defined routines are routines which are developed during a troubleshooting process to address a specific issue under investigation. The code patching subroutine $86_4$ may be also referred to as a "patching element" and may be either a generic or user-defined routine which is patched into system memory.

The stream out subroutine $86_5$ streams out data from the surveillance element-specified one of the communication channels comprising the respective subset to a surveillance channel.

The pre-defined debug action subroutine $86_6$ causes the target processor unit to perform a pre-defined debug action as the surveillance element-specified surveillance action. Executable code for such pre-defined debug actions, illustrated by representative debug action code 87, may be stored in a pre-defined action routine section 58 of pre-loaded, non-modifiable memory portion 52 (see FIG. 4).

The user-defined debug action subroutines $86_7$ is configured to cause the target processor unit to load into the program memory and perform a user-defined debug action as the surveillance element-specified surveillance action. The user-defined debug action may be stored in a dynamically configurable action routine section 89 of modifiable memory portion 54.

The further surveillance element generation subroutine $86_8$ is configured to initiate generation of another surveillance element when the surveillance element-specified surveillance action so requires. The target processor unit in initiating the generation of this another or further surveillance element also specifies the multi-dimensional execution criteria for the further/another surveillance element. Thus, in configuring a surveillance element 70 the operator may prescribe, for the resultant action of a surveillance element 70, the generation or triggering of yet another surveillance element to occur with its own set of trigger conditions or actions. For example, the operator may set up a first surveillance element, the first surveillance element having a trigger and a resultant action (e.g., a predefined user action). That predefined resultant action may set up or generate another surveillance element 70. When and only when the trigger condition occurs for the first surveillance element will the resultant action occur for that first surveillance element, e.g., the setting of the second surveillance element with its own trigger. Then the second surveillance element will be given a chance to trigger based on its (second) trigger. If the second surveillance element triggers it may chain again, e.g., may as its reaction set another (third) surveillance element (e.g., to do some streaming, for example).

In an example implementation, parsing of the surveillance element configuration table 76 by the executable surveillance element executor 66 causes the target processing unit to jump to an appropriate one of the code subroutines 86 as determined, e.g., by the multi-dimensional execution criteria. In another implementation, the executable surveillance code 78 of the surveillance element 70 includes instructions to call or execute the code subroutines 86, with the code for the code subroutines 86 not necessarily being resident in the executable surveillance code 78 but rather in another portion of common memory 34 (FIG. 4). In such case, when the routing entry determines that a particular one of the code subroutines 86 should be called, a jump is made to an instruction which calls or invokes that particular code subroutine 86. Since in such implementation the subroutine 86 is external to the surveillance element 70, data necessary for execution of the called subroutine 86 is passed as an argument or otherwise to the code subroutines 86. Upon completion of its action the invoked subroutine returns to executable surveillance code 78, which also closes.

PIC: Operation: Surveillance Element Execution

Figure 12:
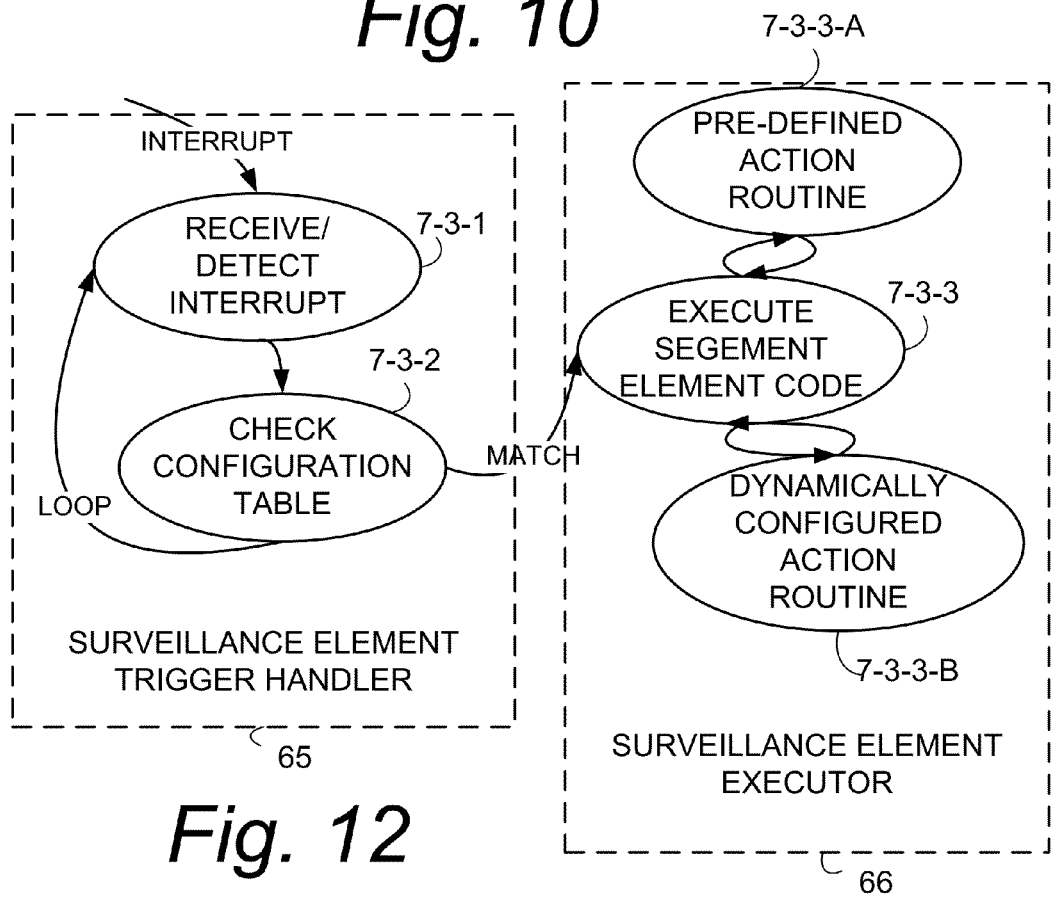
FIG. 12 is a diagrammatic view illustrating example subacts involved in executing an example surveillance element according to an example embodiment and mode.

As mentioned above, act 7-3 comprises executing the surveillance element 70 by the target processor unit. Example sub-acts of act 7-3 are illustrated in FIG. 12. Execution of the surveillance element 70 occurs when the target processing unit receives an interrupt signal (e.g., "interrupt") from its general interrupt generation system. Many interrupts may occur, even on an on-going basis, so it is necessary to determine whether a particular interrupt is intended to launch or prompt execution of a certain surveillance element 70. So when a system interrupt occurs, as act 7-3-1 the surveillance element trigger handler 65 of a processor detects or receives the interrupt. Then, as sub-act 7-3-2 the surveillance element trigger handler 65 searches through the surveillance element library 72 to determine if the surveillance element configuration table 76 of any surveillance elements stored therein have been configured to be initiated by this particular interrupt.

From the foregoing it is understood why, in an example embodiment, the multi-dimensional criteria comprises an indication of a trigger criteria which, when satisfied, prompts execution of the surveillance element. Detection or occurrence of the event which satisfies the trigger criteria generates an interrupt which may be received or encountered by the plural processor units, but evokes a surveillance-element specified surveillance action only for selected ones of the plural processor units.

If, in searching the surveillance element library 72, a match is found between this most recent interrupt and a trigger criteria for a particular surveillance element 70 that causes generation of the interrupt, as sub-act 7-3-3 (FIG. 12) the surveillance element executor 66 of pre-loaded instrumentation code (PIC) 50 causes such surveillance element 70 to be executed. In this regard, the surveillance element executor 66 directs the target processing unit to access the surveillance element configuration table 76 for the trigger-matched surveillance element 70, and via routing entry 81 branches to an appropriate one of the code subroutines 86 based on information such as the multi-dimensional execution criteria obtained from the surveillance element configuration table 76. Execution of one or more of the code subroutines 86 results in the target processing unit performing the surveillance element-specified action for trigger-matched surveillance element 70. In some cases execution of a code subroutine 86 may result in performance of another action routine, such as pre-defined debug action subroutine $86_5$ (act 7-3-3-A) or user-defined debug action subroutine $86_6$ (act 7-3-3-B). It should be appreciated that one or more surveillance elements may be triggered by the same interrupt. After checking for matches, execution of the surveillance element trigger handler 65 returns to await a next interrupt.

Thus, when receiving an interrupt that prompts execution of one of its surveillance elements, a target processing unit may start execution of the interrupt/trigger-matched surveillance element 70 and perform the surveillance actions thereof in multiplexed fashion with the target processing unit's continued handling of the on-going communication operation over a communication channel 26, e.g., the very communication channel which may be involved in the surveillance action of the surveillance element 70. Moreover, the structure and function of the surveillance element 70 may be designed and configured after pre-loading of the pre-loaded instrumentation code (PIC) 50, but the pre-loaded instrumentation code (PIC) 50 itself is not modified but may continue execution and thus serve other processing units which also execute the pre-loaded instrumentation code (PIC) 50. In this regard, plural processing units of a DSP device 30 may be executing instructions (including instructions of pre-loaded instrumentation code (PIC) 50) stored in common memory 34. In such case each of the processing units has its instruction pointer P1-P8 (assuming example embodiment of 8 plural processing units) pointing to an appropriate instruction for fetching that pointed-to instruction into an execution pipe of the processing unit. This permits continued transport of data over the plural communication channels during the execution of the surveillance element 70 without disrupting performance of the one or more operations of the target processor unit with respect to the respective subset of plural communication channels, and while other ones of the plural processor units perform the one or more operations with respect to their respective subsets of plural communication channels, and without modifying the instrumentation code during the execution of the surveillance element.

PIC: Operation: Triggers/Interrupts

As mentioned above, in an example embodiment the multi-dimensional execution criteria comprises an indication of a trigger criteria which, when satisfied, prompts execution of the surveillance element. A detected event which satisfies the trigger criteria may result in an interrupt, which may be classified as either a software interrupt (e.g., an interrupt created by generation of software code [e.g., general CPU operating routines 56 or even pre-loaded instrumentation code (PIC) 50 itself]) or a hardware interrupt.

Figure 13:
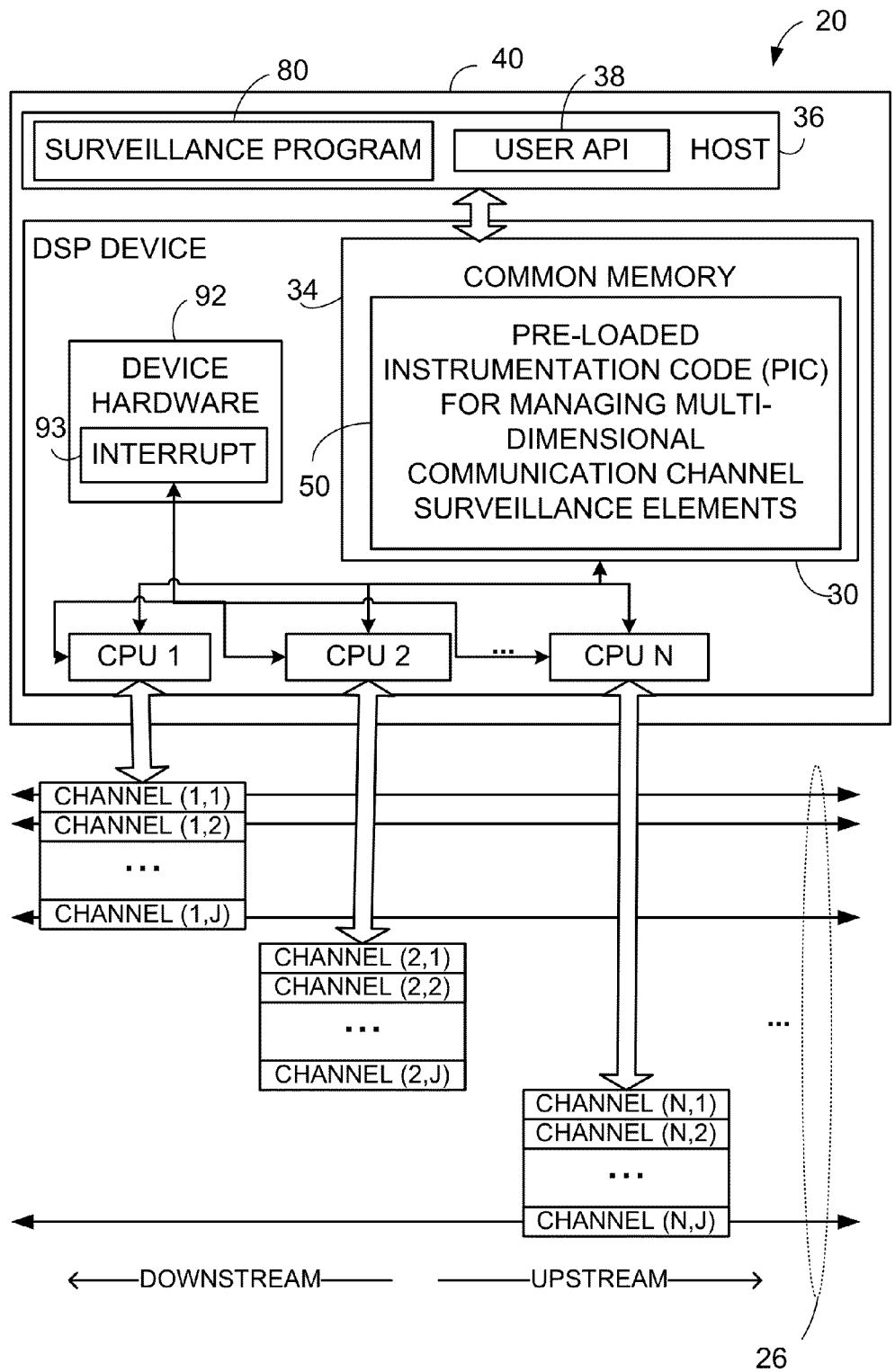
FIG. 13 is a schematic view of a system wherein at least one DSP device comprises hardware circuitry which generates an interrupt signal.

To this end, FIG. 13 illustrates an example communications entity 40 in which at least one DSP device 30 comprises hardware circuitry 92, e.g., on-board silicon-formed circuit elements other than common memory 34 and the processing units. Thus, the DSP device 30 may be a DSP chip or processor, which contains not only a CPU core but also circuitry in silicon which allows set up of a monitoring mechanism based on silicon features of device, e.g., based on the circuitry such as comparators that check address and data buses. An example of such hardware monitoring is described in the emulation logic of TI device TMS320TCI6486.

As shown in FIG. 13, hardware circuitry 92 comprises at least one hardware interrupt generator 93. The hardware interrupt generator 93 is configured to generate a hardware interrupt signal to be applied to processing units whenever the specified condition associated with or specified for the hardware interrupt generator 93 occurs. For example, the hardware interrupt generator 93 may detect a certain prescribed address on a program bus and can generate an interrupt that becomes a trigger for pre-loaded instrumentation code (PIC) 50. That is, when execution reaches a certain address XX on a specified address bus the operator may specify the hardware interrupt generator 93 to trigger an interrupt, or when a certain data value is seen on a certain data bus. Or, the hardware interrupt generator 93 may have options for combining triggers, comparators, and have more or less flexibility depending on manufacturer. Thus, the hardware circuitry 92 and hardware interrupt generator 93 in particular generates an interrupt signal upon occurrence of a circuit event which satisfies the trigger criteria.

Thus, the "hard" or hardware interrupt from hardware interrupt generator 93 provides a different type of triggering, e.g., an ability to trigger on different conditions that could not be triggered on with the pure software trigger implementations. The combination of both hardware interrupts and software interrupts provides bigger space and/or coverage of the type of triggers that may prompt execution of a surveillance element 70.

PIC: Operation: Performance Characterization

Figure 14:
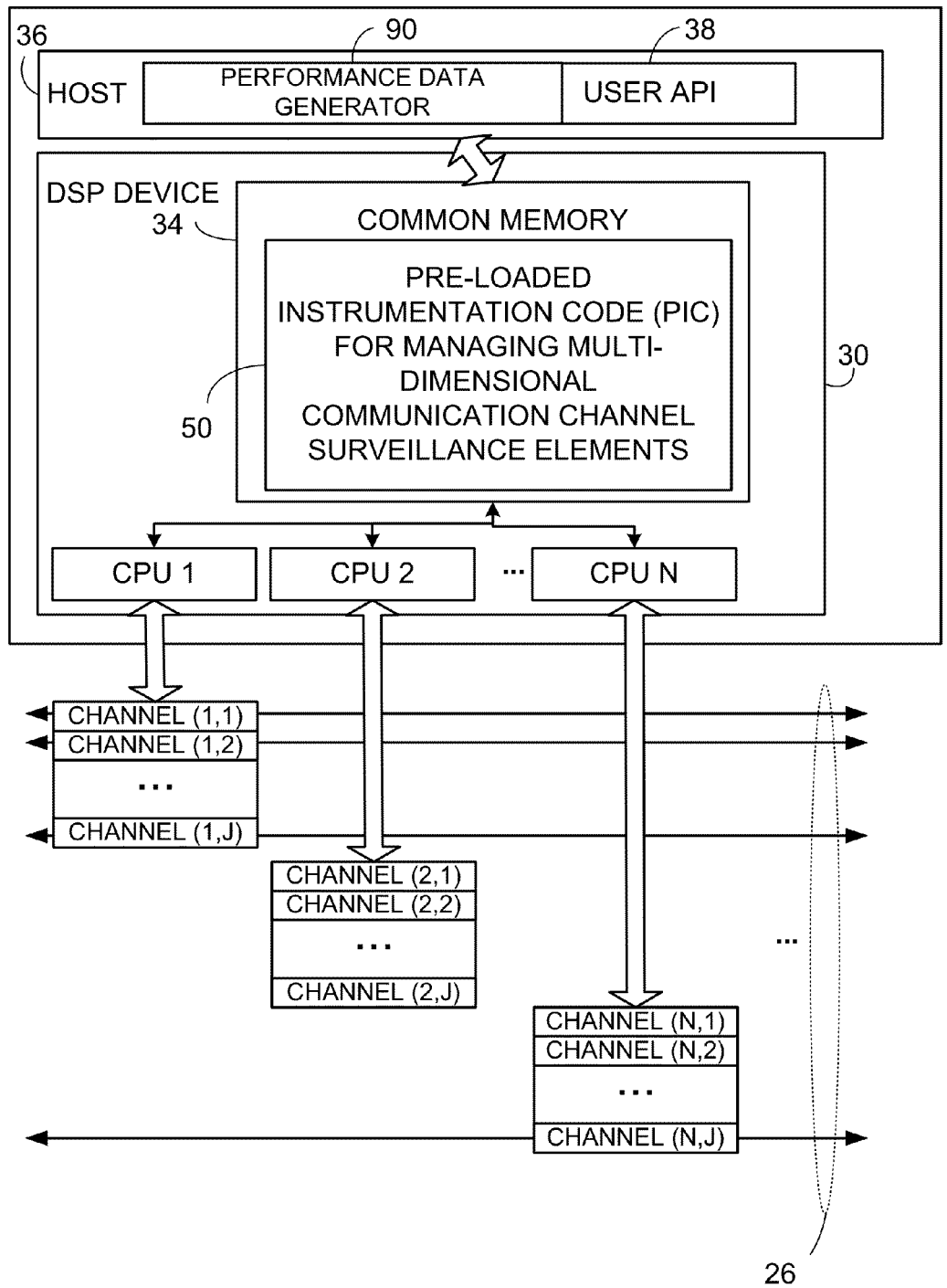
FIG. 14 is a schematic view of a system wherein a host processor has a capability of generating data to facilitate performance characterization for the system according to an example embodiment and mode.

FIG. 14 illustrates an example embodiment wherein host processor 36, as a result of operation of the plural surveillance elements, has a capability of generating data to facilitate performance characterization (e.g., performance characterization data) for a system or portion of a system comprising the target system in which the pre-loaded instrumentation code (PIC) 50 is executed. In this regard, FIG. 14 shows the host processor 36 as comprising performance data generator 90. The performance data generator 90 works in conjunction with data acquisition and reporting unit 67 (FIG. 4) of pre-loaded instrumentation code (PIC) 50 (see FIG. 4). The data acquisition and reporting unit 67 serves to collect data pertaining to the surveillance of the communication channels 26, organizing and saving data collected regarding various communication channels 26 as specified by the performance data generator 90. FIG. 8 shows that, in an example implementation, one of the interrupts handled by surveillance program 80 (FIG. 13) executed on host processor 36 is an interrupt originated from application programmable interface (API) 38 when the operator wants to interact with the data acquisition and reporting unit 67 of pre-loaded instrumentation code (PIC) 50 for specifying what data is to be collected by data acquisition and reporting unit 67 and how (e.g., when and what format) such collected data is to be reported. When an interrupt is received by the host surveillance program 80 that pertains to performance characterization, the performance data generator 90 is activated as shown by act 8-4 of FIG. 8. Through interfaces provided by application programmable interface (API) 38 the performance data generator 90 provides the operator with opportunities to enter information to specify what type of data is to be collected by data acquisition and reporting unit 67, and when and in what format the data acquisition and reporting unit 67 is to report to performance data generator 90.

Figure 15:
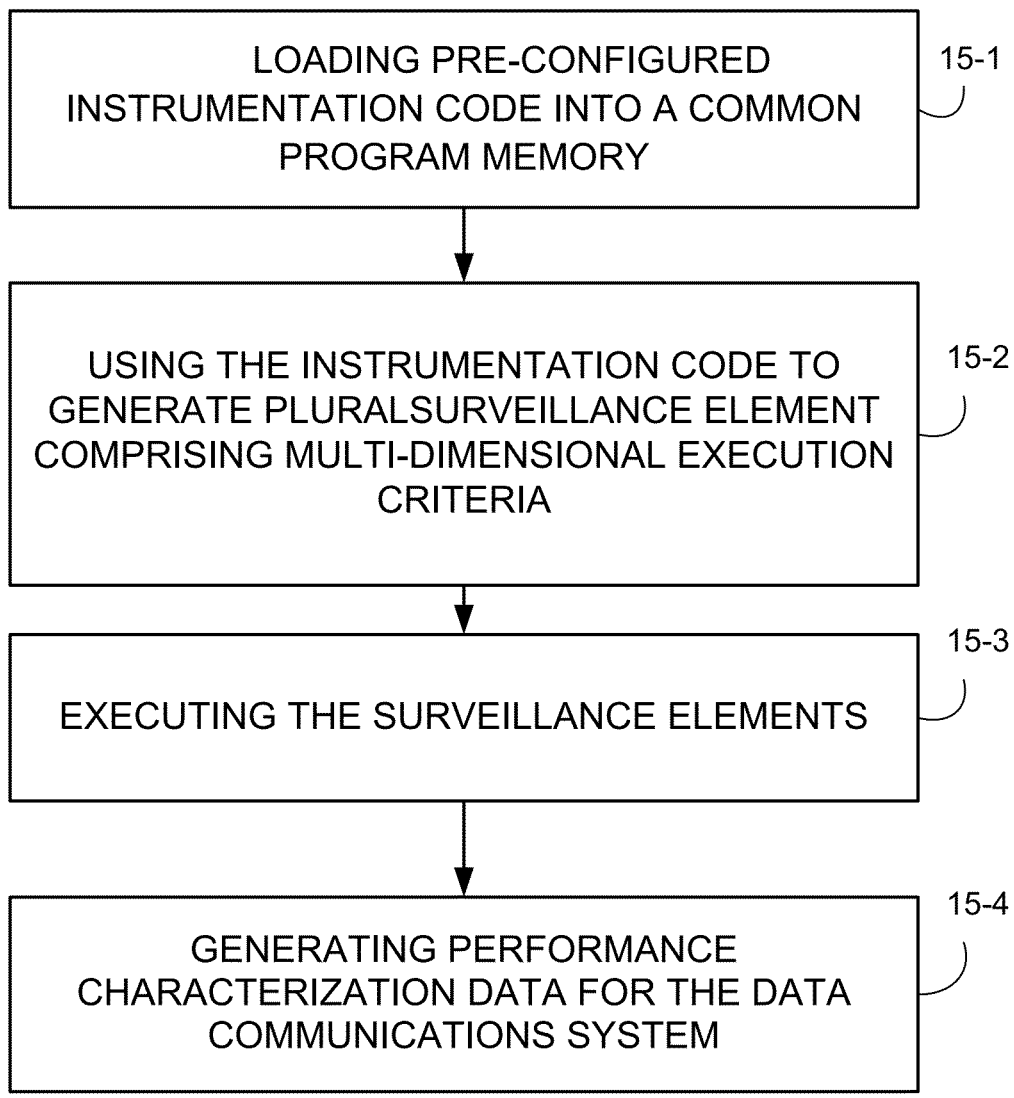
FIG. 15 is a flowchart illustrating example acts or steps pertaining to acquisition and reporting of data to facilitate performance characterization in accordance with an example embodiment and mode.

FIG. 15 shows basic acts or steps pertaining to acquisition and reporting of performance characterization data in accordance with an example embodiment and mode. Act 15-1 comprises loading the pre-loaded instrumentation code (PIC) 50 into common memory 34. Act 15-2 comprises using the pre-loaded instrumentation code (PIC) 50 to generate plural surveillance elements 70 (each surveillance element 70 comprising the multi-dimensional execution criteria). As described herein, in an example embodiment the surveillance elements 70 are generated either after or before onset of the data communications and during execution of the pre-loaded instrumentation code (PIC) 50. Act 15-3 comprises executing the surveillance elements 70. In an example implementation such execution may occur in the context of performance of the communication channel operations. Act 15-4 comprises generating the performance characterization data for the data communication system into which the pre-loaded instrumentation code (PIC) 50 is incorporated.

Thus, the methods and techniques utilized by the technology disclosed herein are equally applicable to data acquisition for the purpose of system or network performance characterization (see, e.g., FIG. 14 and FIG. 15). This type of data collection can be used to profile a subsystem of interest in a customer network. The acquired data can be used for analysis to determine optimal configuration of the target subsystem or to get a more detailed view of operative parameters and network performance. Achieving optimal configuration may require an iterative process whereby continuous monitoring of crucial parameters may be required to fine tune the subsystem for optimal performance. Typically, for troubleshooting purposes data acquisition will most likely be needed on a single channel only, whereas for performance analysis multiple channels may need to be monitored.

PIC: Operation: Troubleshooting

The technology disclosed herein provides powerful and additional troubleshooting capabilities which are devised to take full advantage of the surveillance elements configured for a DSP device 30. These capabilities rely on code and data patching and data streaming techniques. Code and data patching refer to the action of modifying and loading (to a limited extent) the target processor memory, by an external host processor. Program patches refer to loaded executable code fragments, while data patches refer to loaded and/or modified data memory blocks and tables. Data streaming refers to streaming out of any data memory block periodically, as defined by the surveillance element trigger target. The usage of surveillance elements in conjunction with patching and streaming is outlined below.

Steaming out of data of interest can be done non-intrusively at the instance defined by targets or triggers of the surveillance element and the data can be stored by the host processor 36. Captured data can be examined and/or played back off-line from a host storage medium. Alternatively, with proper linkage the streamed data could also be viewed or otherwise treated online in a live manner. In addition, pre-prepared data can be injected, by data patching, into the system memory and processed at the instances defined by the triggers or targets for the surveillance element, without affecting the operation of the live system. In addition to troubleshooting, the data streaming can equally be used to monitor, characterize and tune system and network performance.

Any surveillance element 70 can be configured either with a data capture range or a user debug-action definition, or both. By specifying data capture range only, the data will be logged to a storage medium by default, whereas by specifying user debug action only, only the specified action will be performed. Association with a specific user-defined debug action provides the ability to load and use pre-defined routines, and also allows patching of specialized debug routines into the target system program memory:

Pre-defined load resident debug-action routines can be constant or enhanced with soft configurable arguments which can be patched. They are designed to perform most common debug operations to evaluate hypotheses.

Specialized user-defined debug-action routines can be built during the troubleshooting process to address the immediate problem under investigation, and are patched into the free memory area of the target system.

Debug data snap shots can be scheduled for conditional execution which is done by chaining surveillance element triggers for a single core and channel, without impacting the rest of the live system. This is accomplished by defining user action for the starting surveillance element to be one of the pre-defined user action routines with soft configurable arguments which itself will instrument, via argument patching, another surveillance element with another user-defined debug action.

To provide for even more flexibility, all aforementioned debugging features can be automated by being exercised via user-generated scripts to address specific problems under investigation. The scripts are edited and stored on an external system storage device and can be activated by the user or automatically by a system audit task. Once invoked, the scripts will execute the sequence of surveillance element configurations with targets or triggers chained in order to collect data streaming specified this way.

PIC: Operation: Example Scenario

A sample scenario of use of the technology disclosed herein is briefly outlined below. The example scenario may be performed on a communications entity such as a media gateway, as illustrated in FIG. 3-3. Basic acts performed in conjunction with this example scenario are described as acts S-1 through S-8 below.

Act S-1: A media gateway system performs bearer processing on an array of DSP devices 30 as shown in FIG. 3-3, where each DSP device comprises eight plural processor units. Each CPU core is capable of running 100 channels, for a total of 800 live calls per every DSP device as depicted in FIG. 3-3.

Act S-2: A live system tester identifies a call with poor voice quality which he decides to trouble-shoot. To do so, the following approach using the building blocks described previously can be applied.

Act S-3: The anomalous call is targeted with appropriate granularity, e.g., DSP, CPU core, channel and direction granularity. The bearer for the anomalous call is captured by scripting a basic surveillance element with a fixed program trigger parameter defining snapshot instances, a fixed data range defining the bearer buffer, and a default pre-defined debug action set to data streaming, all of these specified via command parameters. The logged data is retrieved from the system disk and analyzed. Off-line analysis of the bearer characteristics indicates that the anomaly may be conceivably related to voice quality feature X.

Act S-4: Through the patching mechanism provided by the technology disclosed herein, the tester modifies the original configuration table of voice quality feature X. The anomaly appears to be lessened and the troubleshooting process now turns to voice quality feature X.

Act S-5: To narrow down the issue further, another surveillance element is constructed to test this hypothesis. The surveillance element is setup to trigger on execution of condition Y within feature X. If and only if condition Y is invoked, a chained surveillance element is set up to check for condition Z. In the case that condition Z is triggered, values of feature X computational array A should be streamed out. The initial surveillance element for condition Y is setup with a program trigger address defining the trigger instance, no data range address, but user debug action is set up to be a pre-defined load-resident routine. Via argument-patching, this routine creates the second surveillance element as follows: program address of instance Z, data range of computational array A, and no user debug action specified, meaning array A only is to be streamed out periodically at instances Z.

Act S-6: The computational array A logs indicate that some computation is incorrect which corrupts the computational array. To further test this hypothesis, it is required to modify the computational array A at instance Z1 to ensure that proper data will be processed. To do this, a new surveillance element is constructed with a program trigger instance Z1 in conjunction with the range of the computational array A to be modified and data is injected at the time instance specified by trigger condition Z1 to replace computed data in order to evaluate if good voice quality can be restored.

Act S-7: To do this, a new user debug action is devised and associated with a new surveillance element. The new user debug-action routine will write the correct data table to computational array A. The code for the new user debug action consists of the correct computational array data table and the code to write the table to the computational array A. This code is compiled off-line and the created machine code is patched into the free memory space. A new surveillance element is constructed with a program trigger instance Z1, no data range address, and the user debug action specified via a function pointer to the newly patched memory. When trigger condition Z1 occurs, the computational data of array A will be overwritten with the correct data. The live system tester verifies that the previous action cleared the original problem which proves the hypotheses and pin-points the root cause.

Act S-8: All previously set surveillance elements are kept alive so that corrective action is verified until hypothesis is proven and some other surveillance elements may be added along the way.

The described sample trouble shooting session conducted with the debugging means provided by this invention is completely non-intrusive with respect to the remaining channels so no calls are impacted. Also, the number of soft surveillance elements can grow as per the need of the troubleshooting session.

Computer Program Product

Figure 16:
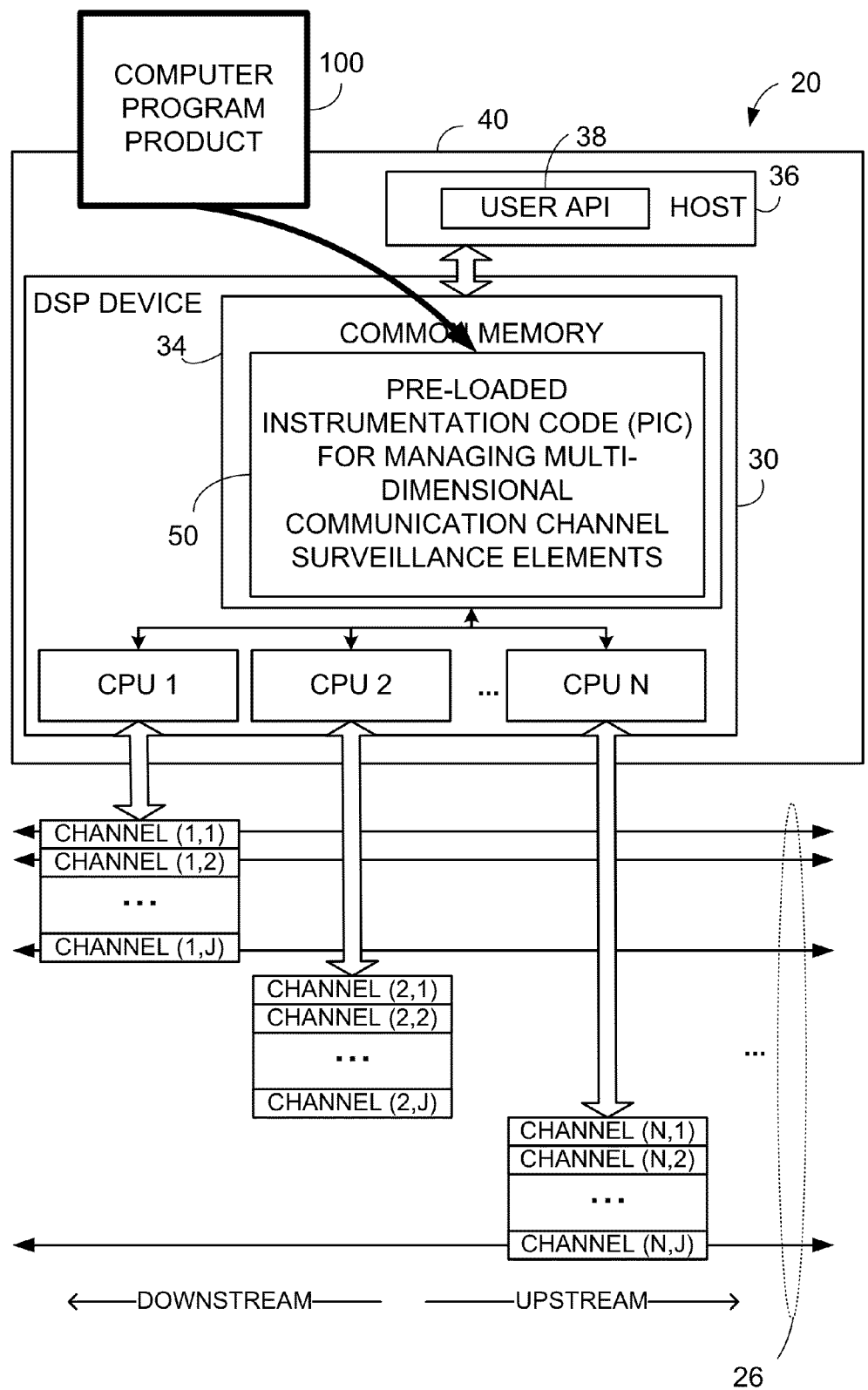
FIG. 16 is a schematic view of a system into which a computer program product may be loaded.

In another of its example aspects the technology disclosed herein concerns a computer program product, depicted as computer program product 100 in FIG. 16. The computer program product 100 comprises coded instructions stored on non-transient computer-readable media. When executed, the computer program product 100 loads pre-loaded instrumentation code (PIC) 50 in common memory 34 of a DSP device 30 before the DSP device 30 begins its handling of communication channels 26. When executed the instructions of the computer program product 100 also perform the acts of pre-loaded instrumentation code (PIC) 50. As described above, the pre-loaded instrumentation code (PIC) 50 is configured so that, when executed, it generates a surveillance element essentially as described herein. In an example implementation, the computer program product 100 is loaded by host 36 into the program memory 34 of the DSP device 30.

Telecommunication Embodiments

It was mentioned above that communications entity 40 (FIG. 1) may take the form of a node or server which performs one or more functions relative to the channels 26 handled by the processing units. Such communications entity 40 may be particularly, but not exclusively employed, in the example context of a telecommunications system such as mobile or fixed wireless telecommunications system.

In a typical cellular radio system, wireless terminals (also known as mobile stations and/or user equipment units (UEs)) communicate via a radio access network (RAN) to one or more core networks. The radio access network (RAN) covers a geographical area which is divided into cell areas, with each cell area being served by a base station, e.g., a radio base station (RBS), which in some networks may also be called, for example, a BS (CDMA2000), "NodeB" (UMTS) or "eNodeB" (LTE). A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units (UE) within range of the base stations.

In some versions of the radio access network, several base stations are typically connected (e.g., by landlines or microwave) to a controller node (such as a radio network controller (RNC) or a base station controller (BSC)) which supervises and coordinates various activities of the plural base stations connected thereto. The radio network controllers are typically connected to one or more core networks.

The Universal Mobile Telecommunications System (UMTS) and/or CDMA2000 is a third generation mobile communication system, which evolved from the second generation (2G) Global System for Mobile Communications (GSM). UTRAN/RAN is essentially a radio access network using wideband code division multiple access for user equipment units (UEs). In a forum known as the Third Generation Partnership Project (3GPP/3GPP2), telecommunications suppliers propose and agree upon standards for third generation networks and UTRAN/RAN specifically, and investigate enhanced data rate and radio capacity. Specifications for the Evolved Universal Terrestrial Radio Access Network (E-UTRAN) are ongoing within the $3^{rd}$ Generation Partnership Project (3GPP). The Evolved Universal Terrestrial Radio Access Network (E-UTRAN) comprises the Long Term Evolution (LTE) and System Architecture Evolution (SAE). Long Term Evolution (LTE) is a variant of a 3GPP radio access technology wherein the radio base station nodes are connected to a core network (via Access Gateways, or AGWs) rather than to radio network controller (RNC) nodes. In general, in LTE the functions of a radio network controller (RNC) node are distributed between the radio base stations nodes (eNodeB's in LTE) and AGWs. As such, the radio access network (RAN) of an LTE system has an essentially "flat" architecture comprising radio base station nodes without reporting to radio network controller (RNC) nodes.

FIG. 3-1 shows communications entity 40-1 as taking a form of an example radio base station node. In the radio base station node of FIG. 3-1 the processing units of the one or more DSP devices 30 perform base station functions. The communication channels 26 in the base station node may extend between a radio interface (which facilitates wireless transmissions with user equipments (UEs)) and either (1) a radio network controller (RNC) node (in the case of a UTRAN radio access network) or (2) a core network interface (in the case of an LTE type radio access network).

FIG. 3-2 illustrates communications entity 40-2 as taking a form of an example radio network controller (RNC) node. In the radio network controller (RNC) node of FIG. 3-2 the processing units of the one or more DSP devices 30 perform functions of a radio network controller (RNC) node. The communication channels 26 in the radio network controller (RNC) node may extend between a base station interface (which communicates over an Iub interface with one or more radio base station nodes) and a core network interface.

FIG. 3-3 illustrates communications entity 40-3 as taking a form of an example of a media gateway (MG). In the media gateway (MG) of FIG. 3-3 the processing units of the one or more DSP devices 30 perform functions of a media gateway (MG). The communication channels 26 in the media gateway (MG) may extend between a radio network controller (RNC) and a core network, or between one core network and another.

As used herein, in a telecommunications environment the term "node" may encompass nodes using any technology including, e.g., high speed packet access (HSPA), long term evolution (LTE), code division multiple access (CDMA) 2000, GSM, etc. or a mixture of technologies such as with a multi-standard radio (MSR) node (e.g., LTE/HSPA, GSM/HS/LTE, CDMA2000/LTE etc). Furthermore the technology described herein may apply to different types of nodes e.g., base station, eNode B, Node B, relay, base transceiver station (BTS), donor node serving a relay node (e.g., donor base station, donor Node B, donor eNB), supporting one or more radio access technologies.

Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

FURTHER DESCRIPTION AND EXAMPLE ADVANTAGES

The technology disclosed herein thus relates to methods, systems, and apparatuses for facilitating troubleshooting in a live system environment. The techniques described herein and encompassed hereby allow the monitoring of parameters deemed relevant at the time of individual troubleshooting sessions, without need for prior instrumentation of the code, such that the monitoring can target specific parameters, as determined during the session, in specific user session or channel, served in a multi-CPU or multi-channel system, without affecting other users or channels. Without prior code instrumentation, the technology disclosed herein allows arbitrary access to any part of data, including the results of temporary computations. In addition, without prior code instrumentation, a processor can be instructed on a case by case basis to take actions as devised and created during the troubleshooting process.

Thus, the technology disclosed herein provides processor device-resident code, e.g., pre-loaded instrumentation code (PIC) 50, which can be exercised remotely during the course of a troubleshooting session for the purpose of collecting specific field data deemed necessary to resolve a field issue at a customer site. The processor device-resident code PIC 50 provides means to, e.g., access and manipulate data, redirect program execution, and inject or capture data streams for later off-line analysis.

The technology disclosed herein takes advantage of capabilities of specially supported multi-dimensional (core, channel/session, execution trigger, user action) surveillance elements 70 to redirect the flow of execution and perform tasks to aid troubleshooting. By combining and chaining the triggers for the surveillance elements 70, which can be set dynamically at arbitrary points within the target code execution flow, it is possible to carry out a wide range of functionality useful to troubleshooting, ranging from capturing snapshots of data structures in memory and modifying data structures at any desirable point in the program execution, to streaming out of any data periodically.

The technology disclosed herein permits debug sessions to be essentially fully automated and dynamically configurable via manual command entry, or through scripting, as through application programmable interface (API) 38 of host processor 36, for example. This allows for immediate investigation of hypotheses and viability of potential solutions without the need for the release of special debug loads.

The technology disclosed herein is applicable to both single devices (e.g., a single processing unit) and multi-core devices (see, e.g., FIG. 1 and FIG. 2) and single or multi-user or multi-channel systems.

The technology disclosed herein overcomes limitations due to small number of hardware-based interrupt generators provided by silicon manufacturer by introduction of software-based or soft multi-dimensional surveillance elements. The number of such surveillance elements is significantly higher since it is limited only by the size of the local CPU memory.

Conventional techniques explicitly instrument the code for the purpose of debugging or monitoring, so that the product code is modified in some way prior to being loaded into a CPU. This modification of product code in the CPU had to happen in the prior art in order to do the prior art monitoring. The technology disclosed herein has the advantage of, e.g., instrumenting the code processors (e.g., via pre-loading of the pre-loaded instrumentation code (PIC) 50 into the common memory 34) and thus in a sense not the product code itself.

The dimensions comprising the multi-dimensional execution criteria are user definable. Using the multi-dimensional execution criteria the technology disclosed herein may work in a multidimensional way and overcome the problem of every processing unit seeing and acting upon the common code which performs the surveillance. According to the technology disclosed herein, a surveillance element only works for the selected processing unit, selected channel, selected direction, and not on other processing units and other channels. Once a surveillance element is configured, it will be active for only one processing unit, e.g., other processing units will encounter the surveillance element but will ignore it.

Furthermore, the technology disclosed herein is equally applicable to data acquisition for the purpose of system or network performance characterization. This type of data collection can be used to profile a subsystem of interest in a customer network. The acquired data can be used for analysis to determine optimal configuration of the target subsystem or to get a more detailed view of operative parameters and network performance. Achieving optimal configuration may require an iterative process whereby continuous monitoring of crucial parameters may be required to fine tune the subsystem for optimal performance. Typically, for troubleshooting purposes data acquisition will most likely be needed on a single channel only, whereas for performance analysis multiple channels may need to be monitored.

The technology disclosed herein provides processing-unit-dedicated and channel or user-session-dedicated surveillance elements. These surveillance elements are both "hard" and "soft". The surveillance elements are hard in the sense that they may be built on top of the silicon monitoring mechanism (s) of the target device, but are "soft" in the sense that they may also built on top of software trap executing from the same shared program memory on all processing units. The surveillance elements may be instrumented to trigger on arbitrary events and spawn execution of pre-selected user-defined actions for a given troubleshooting issue, without halting execution of other processing units and channels or user session. This is important for live system troubleshooting where loss of user sessions or calls is highly undesirable.

The triggers for the surveillance elements may be CPU program and data bus events. For example, a trigger may occur at program execution at a specified address, e.g., hard and soft trigger points. For data bus access, there may be read, write, and value triggers, which may be primarily "hard".

Selective reaction of a surveillance element is user configurable by specifying CPU core ID, user/channel ID, program trigger and user-defined action as a multi-dimensional surveillance element target. The execution of the target action does not affect the rest of the running system.

Software-trap-based or soft surveillance elements concept introduced by the technology disclosed herein ensures that individual cores will selectively react to the software trap without impacting other cores, although the associated software trap is inserted in the shared program memory of a multi-core processor device and is "seen" by all CPU cores or plural processor units. The soft surveillance element makes use of execution redirection techniques to ensure that it remains a multi-dimensional target-dedicated entity, despite the fact that all plural processor units run from the common program memory. The final redirection point is user-defined target action which takes place once a given multi-dimensional target is hit. The execution of target action does not affect the rest of the running system.

The technology disclosed herein allows arbitrary access to any part of troubleshooting data without prior code instrumentation or usage of additional hardware equipment or intrusive debug packages. Conventional code instrumentation requires the release of new s/w debugging patch, the deployment of which, as well as connecting any debug equipment to the live system, is strongly disliked and opposed by customers. Access to any part of troubleshooting data without prior code instrumentation is provided by the following invention features:

Enabling of retrieval of any debug data for selected processing targets without affecting the traffic on the live system, including the selected processing target.

Providing a means to be able to define multi-dimensional debug target with CPU core, session/channel, execution trigger and user-defined action distinction while ensuring the rest of the live system is not affected.

On top of hard monitoring elements provided by silicon manufacturers, the technology disclosed herein enables definition of multi-dimensional debug targets for non-intrusive gathering of desired data and/or reasonable modification of some data tables.

In addition to soft surveillance elements introduced herein, the surveillance elements are made multi-dimensional enabling debug targets for non-intrusive gathering of desired data and/or reasonable modification of some data tables.

Chaining of execution triggers via chain of multi-dimensional surveillance elements to examine or inject data to narrow down race condition problems or prove different hypothesis.

A means to automate the data acquisition process for either troubleshooting or system and/or network characterization, by defining surveillance elements, chaining of the triggers for surveillance elements in order to perform data streaming and data modification as desired. This is done on a case-by-case basis via user-generated scripts to address specific problems under investigation Although the description above contains many specificities, these should not be construed as limiting the scope of the technology disclosed herein but as merely providing illustrations of some of the presently preferred embodiments of the technology disclosed herein. Thus the scope of the technology disclosed herein should be determined by the appended claims and their legal equivalents. Therefore, it will be appreciated that the scope of the technology disclosed herein fully encompasses other embodiments which may become obvious to those skilled in the art, and that the scope of the technology disclosed herein is accordingly to be limited by nothing other than the appended claims, in which reference to an element in the singular is not intended to mean "one and only one" unless explicitly so stated, but rather "one or more." All structural, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology disclosed herein, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method of operating a system which handles plural communication channels, the method comprising:

loading pre-configured instrumentation code into a common program memory stored in a memory device, the instrumentation code and system operation code in the memory device being accessible and executable by plural processor units of the system, the system operation code being configured to cause each of the plural processor units to perform one or more operations, each of the processor units being configured to perform the one or more operations with respect to a respective subset of plural communication channels;

during execution of the system operation code by the plural processor units, using the instrumentation code to generate a surveillance element, the surveillance element comprising multi-dimensional execution criteria and executable surveillance code configured to cause performance by a target processor unit of a surveillance element-specified surveillance action;

executing the surveillance element by the target processor unit.

2. The method of claim 1, further comprising executing the surveillance element without disrupting performance of the one or more operations of the target processor unit with respect to the respective subset of plural communication channels and while other ones of the plural processor units perform the one or more operations with respect to their respective subsets of plural communication channels, and without modifying the instrumentation code during the execution of the surveillance element.

3. The method of claim 1, further comprising specifying the multi-dimensional execution criteria by supplying multi-dimensional execution criteria inputs to the instrumentation code either before or after the onset of the communications over the plural communications channels.

4. The method of claim 1, wherein the multi-dimensional execution criteria comprises at least one of:

an indication of a target digital signal processor circuit upon which resides the target processor unit which is to execute the surveillance element;

an indication of the target processor unit to execute the surveillance element;

an indication of a target channel for surveillance;

an indication of a trigger criteria which, when satisfied, prompts execution of the surveillance element;

an indication of the surveillance element-specified surveillance action; and an indication of direction of a target channel for surveillance.

5. The method of claim 1, wherein the system comprises a digital signal processor device which comprises the plural processor units.

6. The method of claim 1, wherein the system comprises plural digital signal processor devices.

7. The method of claim 1, wherein the system comprises one of a radio base station node, a radio network controller (RNC) node, and a media gateway.

8. The method of claim 1, further comprising generating the surveillance element to comprise a surveillance configuration table and the executable surveillance code configured to cause performance by the target processor unit of the surveillance element-specified surveillance action, the surveillance configuration table being configured to store therein the multi-dimensional execution criteria, the executable surveillance code comprising instructions which are generic to plural surveillance elements created by the instrumentation code but supplied with information from the surveillance configuration table for handling the surveillance element-specified surveillance action.

9. The method of claim 1, further comprising:
executing a host application code on a host processor;
receiving a user command when executing the host application code, the user command including information specifying an issue to be diagnosed;
the host application code translating the information specifying the issue to be diagnosed into the multi-dimensional execution criteria.

10. The method of claim 1, further comprising the target processor unit performing at least one of the following as the surveillance element-specified surveillance action:
monitoring data carried on a surveillance element-specified one of the communication channels comprising the respective subset;
changing data carried on the surveillance element-specified one of the communication channels comprising the respective subset;
redirecting execution by the target processor unit of the system operation code;
patching a defined routine into memory;
streaming out from the surveillance element-specified one of the communication channels comprising the respective subset to a surveillance channel.

11. The method of claim 1, further comprising the target processor unit performing a pre-defined debug action as the surveillance element-specified surveillance action.

12. The method of claim 1, further comprising the target processor unit loading into the program memory and performing a user-defined debug action as the surveillance element-specified surveillance action.

13. The method of claim 1, further comprising the target processor unit initiating generation of another surveillance element as the surveillance element-specified surveillance action, the target processor unit in initiating the generation of the another surveillance element also specifying the multi-dimensional execution criteria for the another surveillance element.

14. The method of claim 1, wherein the multi-dimensional execution criteria comprises an indication of a trigger criteria which, when satisfied, prompts execution of the surveillance element, wherein upon occurrence of an event that satisfies the trigger criteria an interrupt is received by the plural processor units but evokes a surveillance-element specified surveillance action only for selected ones of the plural processor units.

15. The method of claim 1, wherein the multi-dimensional execution criteria comprises an indication of a trigger criteria which, when satisfied, prompts execution of the surveillance element, wherein the system comprises a hardware circuit which generates an interrupt signal upon occurrence of a pre-defined circuit event which satisfies the trigger criteria.

16. The method of claim 1, further comprising:
using the instrumentation code to generate and execute plural surveillance elements;
as a result of executing of the plural surveillance elements, generating performance characterization data for the system.

17. The method of claim 1, further comprising executing the surveillance element by the target processor unit in the context of performance by the target processor unit of the one or more operations with respect to the respective subset of plural communication channels and permitting continued transport of data over the plural communication channels.

18. A system comprising:
a common program memory comprising pre-loaded instrumentation code and system operation code;
plural processor units having access to the common program memory and to the instrumentation code and the system operation code stored therein;
wherein execution of the system operation code causes each of the plural processor units to perform one or more operations, each of the processor units being configured to perform the one or more operations with respect to a respective subset of plural communication channels;
wherein execution of the pre-loaded instrumentation code generates a surveillance element, the surveillance element comprising multi-dimensional execution criteria and executable surveillance code configured to cause performance by a target processor unit of a surveillance element-specified surveillance action with respect to the respective subset of plural communication channels.

19. The system of claim 18, wherein the surveillance element is configured to be executed without disrupting performance of the one or more operations of the target processor unit with respect to the respective subset of plural communication channels and while other ones of the plural processor units perform the one or more operations with respect to their respective subsets of plural communication channels, and without modifying the instrumentation code during the execution of the surveillance element.

20. The system of claim 18, further comprising a host processor configured to specify the multi-dimensional execution criteria to the pre-loaded instrumentation code by supplying multi-dimensional execution criteria inputs either before or after the onset of the communications over the plural communications channels.

21. The system of claim 18, wherein the multi-dimensional execution criteria comprises:
an indication of a target digital signal processor circuit upon which resides the target processor unit which executes the surveillance element;

an indication of the target processor unit to execute the surveillance element;

an indication of a target channel for surveillance;

an indication of a trigger criteria which, when satisfied, prompts execution of the surveillance element;

an indication of the surveillance element-specified surveillance action; and an indication of direction of a target channel for surveillance.

22. The system of claim 18, wherein the system comprises a digital signal processor device which comprises the plural processor units.

23. The system of claim 18, wherein the system comprises plural digital signal processor devices.

24. The system of claim 18, wherein the system comprises one of a radio base station node, a radio network controller (RNC) node, and a media gateway.

25. The system of claim 18, wherein the pre-loaded instrumentation code is configured to generate the surveillance element to comprise a surveillance configuration table and the executable surveillance code configured to cause performance by the target processor unit of the surveillance element-specified surveillance action, the surveillance configuration table being configured to store therein the multi-dimensional execution criteria, the executable surveillance code comprising instructions which are generic to plural surveillance elements created by the instrumentation code but supplied with information from the surveillance configuration table for facilitating the surveillance element-specified surveillance action.

26. The system of claim 18, further comprising a host processor configured to execute a host application code whereby the host processor receives a user command including information specifying an issue to be diagnosed, and whereby the host processor translates the information specifying the issue to be diagnosed into the multi-dimensional execution criteria.

27. The system of claim 18, wherein the surveillance element is configured to cause the target processor unit to perform at least one of the following as the surveillance element-specified surveillance action:

monitor data carried on a surveillance element-specified one of the communication channels comprising the respective subset;

change data carried on the surveillance element-specified one of the communication channels comprising the respective subset;

redirect execution by the target processor unit of the system operation code;

patching a defined routine into memory;

stream out from the surveillance element-specified one of the communication channels comprising the respective subset to a surveillance channel.

28. The system of claim 18, wherein the surveillance element is configured to cause the target processor unit to perform a pre-defined debug action as the surveillance element-specified surveillance action.

29. The system of claim 18, further wherein the surveillance element is configured to cause the target processor unit to load into the program memory and perform a user-defined debug action as the surveillance element-specified surveillance action.

30. The system of claim 18, wherein the surveillance element is configured to cause the target processor unit to initiate generation of another surveillance element as the surveillance element-specified surveillance action, the target processor unit in initiating the generation of the another surveillance element also specifying the multi-dimensional execution criteria for the another surveillance element.

31. The system of claim 18, wherein the multi-dimensional criteria comprises an indication of a trigger criteria to prompt execution of the surveillance element, wherein the detection of an event that satisfies the trigger criteria results in an interrupt which is accessible to the plural processor units but evokes a surveillance-element specified surveillance action only for selected ones of the plural processor units.

32. The system of claim 18, wherein the multi-dimensional execution criteria comprises an indication of a trigger criteria which, when satisfied, prompts execution of the surveillance element, wherein the system comprises a hardware circuit which generates an interrupt signal upon occurrence of a pre-defined circuit event which satisfies the trigger criteria.

33. The system of claim 18, wherein the instrumentation code is configured to generate and execute plural surveillance elements, and further comprising a host processor which, as a result of executing of the plural surveillance elements, generates performance characterization data for the system.

34. The system of claim 18, wherein execution of the pre-loaded instrumentation code causes execution of the surveillance element by the target processor unit in the context of performance by the target processor unit of the one or more operations with respect to the respective subset of plural communication channels and permitting continued transport of data over the plural communication channels.

35. A computer program product comprising coded instructions stored on non-transient computer-readable media which, when executed, perform the acts of:

loading pre-configured instrumentation code into a common program memory of a communication device;

the pre-configured instrumentation code being configured, when executed, to generate a surveillance element, the surveillance element comprising multi-dimensional execution criteria and executable surveillance code configured to cause performance by a target processor unit of a specified surveillance action, the target processor unit being one of plural processor units comprising the system, each of the processor units being configured to perform one or more operations with respect to a respective subset of plural communication channels;

the surveillance element, when and while executed, permitting continued transport of data over the plural communication channels.

36. The computer program product of claim 35, wherein the surveillance element is configured to be executed without disrupting performance of the one or more operations of the target processor unit with respect to the respective subset of plural communication channels and while other ones of the plural processor units perform the one or more operations with respect to their respective subsets of plural communication channels, and without modifying the instrumentation code during the execution of the surveillance element.

37. The computer program product of claim 35, wherein the pre-loaded instrumentation code is configured to receive multi-dimensional execution criteria inputs either before or after the onset of the communications over the plural communications channels.

38. The computer program product of claim 35, wherein the multi-dimensional execution criteria comprises:

an indication of a target digital signal processor circuit upon which resides the target processor unit which is execute the surveillance element;

an indication of the target processor unit to execute the surveillance element;

an indication of a target channel for surveillance;

an indication of a trigger criteria which, when satisfied, prompts execution of the surveillance element; and an indication of the surveillance element-specified surveillance action; and, an indication of a target channel for surveillance.

39. The computer program product of claim 35, wherein the pre-loaded instrumentation code is configured to generate the surveillance element to comprise a surveillance configuration table and executable surveillance code, and wherein the surveillance code is configured to cause performance by the target processor unit of the surveillance element-specified surveillance action, the surveillance configuration table being configured to store therein the multi-dimensional execution criteria, the executable surveillance code comprising instructions which are generic to plural surveillance elements created by the instrumentation code but supplied with information from the surveillance configuration table for facilitating the surveillance element-specified surveillance action.

40. The computer program product of claim 35, wherein the computer program product further comprises host application code executed on a host processor, the host application code being configured to receive a user command from the host processor, the user command including information specifying an issue to be diagnosed; the host application code being further configured to translate the information specifying the issue to be diagnosed into the multi-dimensional execution criteria for use by the pre-loaded instrumentation code.

41. The computer program product of claim 35, wherein the pre-loaded instrumentation code is configured to generate the surveillance element to perform at least one of the following as the surveillance element-specified surveillance action:

monitor data carried on a surveillance element-specified one of the communication channels comprising the respective subset;

change data carried on the surveillance element-specified one of the communication channels comprising the respective subset;

redirect execution by the target processor unit of the system operation code;

patching a defined routine into memory;

stream out from the surveillance element-specified one of the communication channels comprising the respective subset to a surveillance channel.

42. The computer program product of claim 35, wherein the surveillance element is configured to perform a pre-defined debug action as the surveillance element-specified surveillance action.

43. The computer program product of claim 35, wherein the surveillance element is configured to perform a user-defined debug action as the surveillance element-specified surveillance action.

44. The computer program product of claim 35, wherein the surveillance element is configured to generate another surveillance element as the surveillance element-specified surveillance action, and wherein the multi-dimensional execution criteria is also specified for the another surveillance element.

45. The computer program product of claim 35, wherein the multi-dimensional criteria comprises an indication of a trigger criteria which, when satisfied, prompts execution of the surveillance element, wherein detection of an event which satisfies the trigger criteria generates an interrupt which is encountered by the plural processor units but evokes a surveillance-element specified surveillance action only for selected ones of the plural processor units.

46. The computer program product of claim 35, wherein the multi-dimensional execution criteria comprises an indication of a trigger criteria which, when satisfied, prompts execution of the surveillance element, wherein the system comprises a hardware circuit which generates an interrupt signal upon occurrence of a circuit event which satisfies the trigger criteria.

47. The computer program product of claim 35, wherein the pre-loaded instrumentation code is configured to generate and execute plural surveillance elements and, as a result of executing of the plural surveillance elements, the computer program product generates performance characterization data for the system.

\* \* \* \* \*